(12) United States Patent
Friesen et al.

(10) Patent No.: US 8,546,028 B2
(45) Date of Patent: Oct. 1, 2013

(54) ELECTROCHEMICAL CELL, AND PARTICULARLY A CELL WITH ELECTRODEPOSITED FUEL

(71) Applicant: Arizona Board Regents for and on behalf of Arizona State University, Tempe, AZ (US)

(72) Inventors: Cody A. Friesen, Fort McDowell, AZ (US); Joel Hayes, Chandler, AZ (US)

(73) Assignee: Arizona Board of Regents for and on behalf of Arizona State University, Tempe, AZ (US)

( * ) Notice: Subject to any disclaimer, the term of this patent is extended or adjusted under 35 U.S.C. 154(b) by 0 days.

(21) Appl. No.: 13/659,830

(22) Filed: Oct. 24, 2012

(65) Prior Publication Data
US 2013/0049694 A1    Feb. 28, 2013

Related U.S. Application Data

(62) Division of application No. 12/385,489, filed on Apr. 9, 2009, now Pat. No. 8,309,259.

(60) Provisional application No. 61/054,364, filed on May 19, 2008, provisional application No. 61/086,241, filed on Aug. 5, 2008.

(51) Int. Cl.
| | | |
|---|---|---|
| H01M 8/22 | (2006.01) |
| H01M 8/00 | (2006.01) |
| H01M 4/36 | (2006.01) |
| H01M 8/06 | (2006.01) |
| H01M 8/04 | (2006.01) |
| H01M 8/14 | (2006.01) |
| H01M 8/08 | (2006.01) |
| H01M 6/50 | (2006.01) |
| H01M 10/42 | (2006.01) |
| H01M 6/24 | (2006.01) |
| H01M 10/00 | (2006.01) |
| H01M 6/00 | (2006.01) |
| A01K 79/02 | (2006.01) |
| B01D 59/40 | (2006.01) |

(52) U.S. Cl.
USPC ............ 429/402; 429/400; 429/405; 429/415; 429/428; 429/476; 429/477; 429/498; 429/502; 429/49; 429/101; 429/122; 205/799

(58) Field of Classification Search
USPC .................. 429/400, 402, 404, 405, 415, 428, 429/476, 477, 498, 502, 49, 101, 122; 205/799
See application file for complete search history.

(56) References Cited

U.S. PATENT DOCUMENTS

| 2,083,364 A | 6/1937 | Cook, Jr. |
| 3,219,486 A | 11/1965 | Gumucio |

(Continued)

FOREIGN PATENT DOCUMENTS

| CN | 100037 | 1/2012 |
| EP | 0058090 | 8/1982 |

(Continued)

OTHER PUBLICATIONS

Thirsk (Electrochemistry vol. 4 p. 16, Thirsk, ed. The Chemical Society Great Britain Oxford Alden Press 1974).

(Continued)

*Primary Examiner* — Patrick Ryan
*Assistant Examiner* — Aaron Greso
(74) *Attorney, Agent, or Firm* — Pillsbury Winthrop Shaw Pittman LLP

(57) ABSTRACT

The present invention relates to a method for charging the cell by electrodeposition of metal fuel on the anode thereof.

38 Claims, 15 Drawing Sheets

(56) References Cited

U.S. PATENT DOCUMENTS

| | | | |
|---|---|---|---|
| 3,223,611 A | 12/1965 | Wells et al. | |
| 3,338,746 A | 8/1967 | Plust et al. | |
| 3,483,036 A | 12/1969 | Gregor | |
| 3,489,610 A * | 1/1970 | McClelland et al. | 429/206 |
| 3,525,643 A | 8/1970 | Spahrbier et al. | |
| 3,532,548 A * | 10/1970 | Stachurski | 429/487 |
| 3,615,843 A | 10/1971 | Moran | |
| 3,615,844 A | 10/1971 | Spengler | |
| 3,650,837 A | 3/1972 | Palmer | |
| 3,713,892 A | 1/1973 | Moran | |
| 3,716,413 A | 2/1973 | Eisner | |
| 3,717,505 A | 2/1973 | Unkle, Jr. et al. | |
| 3,728,244 A | 4/1973 | Cooley | |
| 3,785,868 A | 1/1974 | Devitt | |
| 3,801,376 A | 4/1974 | Lindstrom | |
| 3,822,149 A | 7/1974 | Hale | |
| 3,840,455 A | 10/1974 | Cooley et ad. | |
| 3,850,696 A | 11/1974 | Summers et al. | |
| 3,886,426 A | 5/1975 | Daggett | |
| 3,902,916 A | 9/1975 | Warszawski | |
| 3,919,062 A | 11/1975 | Lundquist, Jr. et al. | |
| 3,972,727 A | 8/1976 | Cohn | |
| 4,007,059 A * | 2/1977 | Witherspoon et al. | 429/9 |
| 4,119,772 A | 10/1978 | Peters et al. | |
| 4,139,679 A * | 2/1979 | Appleby et al. | 429/404 |
| 4,201,653 A | 5/1980 | O'Neill et al. | |
| 4,312,927 A | 1/1982 | Salmon | |
| 4,317,863 A | 3/1982 | Struthers | |
| 4,340,449 A | 7/1982 | Srinivasan et al. | |
| 4,385,101 A | 5/1983 | Catanzarite | |
| 4,385,967 A | 5/1983 | Brady et al. | |
| 4,447,504 A | 5/1984 | Goebel | |
| 4,461,817 A | 7/1984 | Itoh et al. | |
| 4,521,497 A | 6/1985 | Tamminen | |
| 4,581,064 A | 4/1986 | Morrison et al. | |
| 4,684,585 A | 8/1987 | Tamminen | |
| 4,693,946 A | 9/1987 | Niksa et al. | |
| 4,732,823 A | 3/1988 | Ito et al. | |
| 4,871,627 A | 10/1989 | Strong et al. | |
| 4,894,355 A | 1/1990 | Takeuchi et al. | |
| 5,009,755 A | 4/1991 | Shor | |
| 5,104,497 A | 4/1992 | Tetzlaff et al. | |
| 5,185,218 A | 2/1993 | Brokman et al. | |
| 5,190,833 A | 3/1993 | Goldstein et al. | |
| 5,318,861 A | 6/1994 | Harats et al. | |
| 5,376,471 A | 12/1994 | Hunter et al. | |
| 5,415,949 A | 5/1995 | Stone et al. | |
| 5,431,823 A | 7/1995 | Gofer | |
| 5,434,020 A | 7/1995 | Cooper | |
| 5,439,758 A | 8/1995 | Stone et al. | |
| 5,458,988 A | 10/1995 | Putt | |
| 5,567,540 A | 10/1996 | Stone et al. | |
| 5,650,240 A | 7/1997 | Rogers | |
| 5,652,068 A | 7/1997 | Shuster et al. | |
| 5,733,677 A | 3/1998 | Golovin et al. | |
| 5,850,136 A | 12/1998 | Kaneko | |
| 5,935,724 A | 8/1999 | Spillman et al. | |
| 5,935,728 A | 8/1999 | Spillman et al. | |
| 5,938,899 A | 8/1999 | Forand | |
| 5,972,531 A | 10/1999 | Kawakami | |
| 5,998,967 A | 12/1999 | Umeki et al. | |
| 6,014,013 A | 1/2000 | Suppanz et al. | |
| 6,025,696 A | 2/2000 | Lenhart et al. | |
| 6,027,834 A | 2/2000 | Hayashi et al. | |
| 6,034,506 A | 3/2000 | Hall | |
| 6,046,514 A | 4/2000 | Rouillard et al. | |
| 6,054,840 A | 4/2000 | Nakanishi et al. | |
| 6,057,052 A | 5/2000 | Shrim et al. | |
| 6,091,230 A | 7/2000 | Winzer | |
| 6,127,061 A | 10/2000 | Shun et al. | |
| 6,153,328 A | 11/2000 | Colborn | |
| 6,162,555 A | 12/2000 | Gutierrez et al. | |
| 6,165,638 A | 12/2000 | Spillman et al. | |
| 6,207,037 B1 | 3/2001 | Dartnell et al. | |
| 6,211,650 B1 | 4/2001 | Mumaw et al. | |
| 6,265,846 B1 | 7/2001 | Flechsig et al. | |
| 6,271,646 B1 | 8/2001 | Evers et al. | |
| 6,277,508 B1 | 8/2001 | Reiser et al. | |
| 6,312,846 B1 | 11/2001 | Marsh | |
| 6,355,369 B1 | 3/2002 | Iarochenko et al. | |
| 6,379,828 B1 | 4/2002 | Worth | |
| 6,383,673 B1 | 5/2002 | Faris et al. | |
| 6,383,675 B1 | 5/2002 | Zhong | |
| 6,410,174 B1 | 6/2002 | Faris | |
| 6,458,480 B1 | 10/2002 | Morris et al. | |
| 6,465,638 B2 | 10/2002 | Gorman et al. | |
| 6,472,093 B2 | 10/2002 | Faris et al. | |
| 6,541,941 B2 | 4/2003 | Adams et al. | |
| 6,544,678 B2 | 4/2003 | Faris et al. | |
| 6,558,830 B2 | 5/2003 | Faris et al. | |
| 6,562,494 B1 | 5/2003 | Tsai et al. | |
| 6,562,504 B2 | 5/2003 | Faris et al. | |
| 6,566,000 B1 | 5/2003 | Iarochenko et al. | |
| 6,569,555 B1 | 5/2003 | Faris et al. | |
| 6,579,637 B1 | 6/2003 | Savage et al. | |
| 6,586,909 B1 | 7/2003 | Trepka | |
| 6,641,943 B1 | 11/2003 | Faris et al. | |
| 6,646,418 B1 | 11/2003 | Xie et al. | |
| 6,649,294 B2 | 11/2003 | Faris et al. | |
| 6,653,252 B2 | 11/2003 | Kawahara | |
| 6,673,490 B2 | 1/2004 | Miki et al. | |
| 6,677,077 B2 | 1/2004 | Spillman et al. | |
| 6,706,433 B2 | 3/2004 | Pinto et al. | |
| 6,713,206 B2 | 3/2004 | Markoski et al. | |
| 6,756,149 B2 | 6/2004 | Knights et al. | |
| 6,762,587 B1 | 7/2004 | Barbetta | |
| 6,764,588 B2 | 7/2004 | Smedley et al. | |
| 6,787,260 B2 | 9/2004 | Smedley | |
| 6,802,946 B2 | 10/2004 | Basol et al. | |
| 6,811,903 B2 | 11/2004 | Vartak et al. | |
| 6,822,423 B2 | 11/2004 | Yau et al. | |
| 6,838,203 B2 | 1/2005 | Zheng | |
| 6,855,455 B1 | 2/2005 | Berger et al. | |
| 6,858,347 B2 | 2/2005 | Tanigawa | |
| 6,866,950 B2 | 3/2005 | Connor et al. | |
| 6,902,602 B2 | 6/2005 | Keefer et al. | |
| 6,911,274 B1 | 6/2005 | Colborn et al. | |
| 6,942,105 B2 | 9/2005 | Smedley et al. | |
| 6,967,064 B2 | 11/2005 | Haltiner, Jr. et al. | |
| 6,986,964 B2 | 1/2006 | Faris | |
| 7,020,355 B2 | 3/2006 | Lahann et al. | |
| 7,126,310 B1 | 10/2006 | Barron | |
| 7,150,933 B1 | 12/2006 | McLean | |
| 7,201,857 B2 | 4/2007 | Ovshinsky et al. | |
| 7,226,676 B2 | 6/2007 | Faris et al. | |
| 7,238,440 B2 | 7/2007 | Damore et al. | |
| 7,252,898 B2 | 8/2007 | Markoski et al. | |
| 7,270,906 B2 | 9/2007 | Haltiner, Jr. et al. | |
| 7,273,541 B2 | 9/2007 | Choban et al. | |
| 7,276,309 B2 | 10/2007 | Smedley et al. | |
| 7,279,245 B1 | 10/2007 | Clark | |
| 7,291,186 B2 | 11/2007 | Zhang | |
| 7,303,835 B2 | 12/2007 | Mathias et al. | |
| 7,466,104 B2 | 12/2008 | Wang et al. | |
| 7,468,221 B2 | 12/2008 | LaFollette et al. | |
| 7,482,081 B2 | 1/2009 | Hong | |
| 7,488,547 B1 | 2/2009 | Iacovelli | |
| 7,535,199 B2 | 5/2009 | Kimura et al. | |
| 7,598,706 B2 | 10/2009 | Koski et al. | |
| 7,670,575 B2 | 3/2010 | Jarvinen et al. | |
| 7,670,705 B2 | 3/2010 | Ueda et al. | |
| 7,670,724 B1 | 3/2010 | Chan et al. | |
| 7,722,988 B2 | 5/2010 | Webber | |
| 8,058,165 B2 | 11/2011 | Kawano et al. | |
| 2001/0007725 A1 | 7/2001 | Faris et al. | |
| 2001/0014416 A1 * | 8/2001 | Faris et al. | 429/27 |
| 2002/0015871 A1 | 2/2002 | Tao et al. | |
| 2002/0028372 A1 | 3/2002 | Ohlsen | |
| 2002/0045075 A1 | 4/2002 | Pinto et al. | |
| 2002/0076602 A1 | 6/2002 | Finkelshtain et al. | |
| 2002/0098398 A1 | 7/2002 | Chen | |
| 2002/0142203 A1 | 10/2002 | Ma et al. | |
| 2003/0054217 A1 | 3/2003 | Faris | |
| 2003/0077501 A1 | 4/2003 | Knights et al. | |

| | | |
|---|---|---|
| 2003/0099882 A1 | 5/2003 | Hampden-Smith et al. |
| 2003/0134163 A1 | 7/2003 | Markoski et al. |
| 2003/0143446 A1 | 7/2003 | Faris et al. |
| 2003/0165727 A1 | 9/2003 | Priestnall et al. |
| 2003/0190504 A1 | 10/2003 | Fisher et al. |
| 2003/0198862 A1 | 10/2003 | Struthers |
| 2004/0005488 A1 | 1/2004 | Faris et al. |
| 2004/0023112 A1 | 2/2004 | Lin |
| 2004/0053132 A1 | 3/2004 | Smedley et al. |
| 2004/0058203 A1 | 3/2004 | Priestnall et al. |
| 2004/0058217 A1 | 3/2004 | Ohlsen et al. |
| 2004/0058226 A1 | 3/2004 | Lamarre et al. |
| 2004/0121208 A1 | 6/2004 | James et al. |
| 2004/0146764 A1 | 7/2004 | Tsai et al. |
| 2004/0157092 A1 | 8/2004 | Kimberg et al. |
| 2004/0157101 A1 | 8/2004 | Smedley |
| 2004/0175603 A1 | 9/2004 | Yang et al. |
| 2004/0180246 A1 | 9/2004 | Smedley |
| 2004/0185323 A1 | 9/2004 | Fowler et al. |
| 2004/0185328 A1 | 9/2004 | Lin et al. |
| 2004/0225249 A1 | 11/2004 | Leonard et al. |
| 2004/0229107 A1 | 11/2004 | Smedley |
| 2004/0247969 A1 | 12/2004 | Faris et al. |
| 2005/0019634 A1 | 1/2005 | Legg |
| 2005/0019651 A1 | 1/2005 | Tsai et al. |
| 2005/0031911 A1 | 2/2005 | Venkatesan et al. |
| 2005/0084737 A1 | 4/2005 | Wine et al. |
| 2005/0123815 A1 | 6/2005 | Tsai et al. |
| 2005/0170245 A1 | 8/2005 | Vartak et al. |
| 2005/0196656 A1 | 9/2005 | Gomez |
| 2005/0208343 A1 | 9/2005 | Kim et al. |
| 2005/0233191 A1 | 10/2005 | Ushio |
| 2006/0003217 A1 | 1/2006 | Cohen et al. |
| 2006/0024551 A1 | 2/2006 | Smotkin |
| 2006/0038536 A1 | 2/2006 | LaFollette et al. |
| 2006/0076295 A1 | 4/2006 | Leonard et al. |
| 2006/0127731 A1 | 6/2006 | Faris |
| 2006/0210867 A1 | 9/2006 | Kenis et al. |
| 2006/0228622 A1 | 10/2006 | Cohen et al. |
| 2006/0234855 A1 | 10/2006 | Gorte et al. |
| 2006/0269826 A1 | 11/2006 | Katz et al. |
| 2006/0292407 A1 | 12/2006 | Gervasio et al. |
| 2007/0020496 A1 | 1/2007 | Pelton et al. |
| 2007/0048577 A1 | 3/2007 | Ringeisen et al. |
| 2007/0077491 A1 | 4/2007 | Burchardt |
| 2007/0092787 A1 | 4/2007 | Wang Chen |
| 2007/0120091 A1 | 5/2007 | Ovshinsky et al. |
| 2007/0141415 A1 | 6/2007 | Yang et al. |
| 2007/0141430 A1 | 6/2007 | Huang et al. |
| 2007/0141432 A1 | 6/2007 | Wang et al. |
| 2007/0141440 A1 | 6/2007 | Yang et al. |
| 2007/0141450 A1 | 6/2007 | Yang et al. |
| 2007/0154766 A1 | 7/2007 | Baik et al. |
| 2007/0166602 A1 | 7/2007 | Burchardt |
| 2007/0184314 A1 | 8/2007 | Kagami |
| 2007/0224500 A1 | 9/2007 | White et al. |
| 2007/0234900 A1 | 10/2007 | Soloveichik et al. |
| 2007/0237993 A1 | 10/2007 | Carlsson et al. |
| 2007/0248845 A1 | 10/2007 | Armstrong et al. |
| 2007/0248868 A1 | 10/2007 | Haltiner et al. |
| 2007/0259234 A1 | 11/2007 | Chua et al. |
| 2007/0264550 A1 | 11/2007 | Zhang et al. |
| 2007/0269695 A1 | 11/2007 | Yamazaki et al. |
| 2007/0278107 A1 | 12/2007 | Barnett et al. |
| 2007/0287034 A1 | 12/2007 | Minteer et al. |
| 2008/0008911 A1 | 1/2008 | Stroock et al. |
| 2008/0009780 A1 | 1/2008 | Leonard et al. |
| 2008/0026265 A1 | 1/2008 | Markoski et al. |
| 2008/0032170 A1 | 2/2008 | Wainright et al. |
| 2008/0044721 A1 | 2/2008 | Heller et al. |
| 2008/0145719 A1 | 6/2008 | Yang et al. |
| 2008/0145721 A1 | 6/2008 | Shapiro et al. |
| 2008/0145737 A1 | 6/2008 | Cai et al. |
| 2008/0154101 A1 | 6/2008 | Jain et al. |
| 2008/0231231 A1 | 9/2008 | Hartzog |
| 2008/0241617 A1 | 10/2008 | Sato |
| 2008/0252257 A1 | 10/2008 | Sufrin-Disler et al. |
| 2008/0268341 A1 | 10/2008 | Zhang |
| 2009/0027006 A1 | 1/2009 | Vezzini et al. |
| 2009/0081488 A1 | 3/2009 | Sato et al. |
| 2009/0117429 A1 | 5/2009 | Zillmer et al. |
| 2009/0167242 A1 | 7/2009 | Naganuma et al. |
| 2009/0230921 A1 | 9/2009 | Hsu et al. |
| 2009/0286149 A1 | 11/2009 | Ci et al. |
| 2009/0305090 A1 | 12/2009 | Chuang |
| 2010/0062303 A1 | 3/2010 | Bae et al. |
| 2010/0119895 A1 | 5/2010 | Friesen |
| 2010/0285375 A1 | 11/2010 | Friesen et al. |
| 2010/0316935 A1 | 12/2010 | Friesen et al. |
| 2011/0039181 A1 | 2/2011 | Friesen et al. |
| 2011/0044528 A1 | 2/2011 | Tsuchiya et al. |
| 2011/0070506 A1 | 3/2011 | Friesen et al. |
| 2011/0086278 A1 | 4/2011 | Friesen et al. |
| 2011/0189551 A1 | 8/2011 | Friesen et al. |
| 2011/0200893 A1 | 8/2011 | Friesen et al. |
| 2011/0250512 A1 | 10/2011 | Friesen et al. |
| 2011/0305959 A1 | 12/2011 | Friesen et al. |
| 2011/0316485 A1 | 12/2011 | Krishnan et al. |
| 2012/0015264 A1 | 1/2012 | Friesen et al. |
| 2012/0068667 A1 | 3/2012 | Friesen et al. |

FOREIGN PATENT DOCUMENTS

| | | |
|---|---|---|
| EP | 0589144 | 10/1996 |
| EP | 2274781 | 1/2011 |
| GB | 1286173 | 8/1972 |
| WO | WO8905528 | 6/1989 |
| WO | WO2008058165 | 5/2008 |
| WO | WO2011035176 | 3/2011 |
| WO | WO2011044528 | 4/2011 |
| WO | WO2011163553 | 12/2011 |
| WO | WO2012012364 | 1/2012 |

OTHER PUBLICATIONS

Jorne et al, (Journal of the Electrochemical Society vol. 134 No. 6, pp. 1399-1402).
Kamil S. Salloum et al., Sequential flow membraneless microfluidic fuel cell with porous electrodes, Journal of Power Sources 180, 2008, pp. 243-252.
International Search Report for PCT International Patent Application No. PCT/US2009/039460, mailed on May 26, 2009.
International Search Report for PCT International Patent Application No. PCT/US2009/040658, mailed on Aug. 24, 2009.
Stuart I. Smedley et al., "A regenerative zinc-air fuel cell", Journal of Power Sources, vol. 165, 2007, pp. 897-904.
N.J. Cherepy et al., "A Zinc/Air Fuel Cell for Electric Vehicles", IEEE publication, 1999, pp. 11-13.
International Preliminary Report on Patentability (Chapter 1 of the Patent Cooperation Treaty) for International Application No. PCT/US2009/040658 mailed Dec. 2, 2010.
Cohen et al., "Fabrication and preliminary testing of a planar membraneless microchannel fuel cell," J. Power Sources, 2005, 139, 96-105.
Ferrigno et al., "Membraneless Vanadium Redox Fuel Cell Using Laminar Flow," J. Am. Chem. Soc. 2002, 124, pp. 12930-12931.
Jayashree et al., "Air-Breathing Laminar Flow-Based Microfluidic Fuel Cell", J. Am. Chem. Soc., 2005, 127, pp. 16758-16759.
Jorne et al. (Journal of the Electrochemical Society vol. 134 No. 6, pp. 1399-1402 (Jun. 1987).
Smedley et al., "A regenerative zinc-air fuel cell," Journal of Power Sources, vol. 165, 2007, pp. 897-904.
Ross, P. N., et al., "Feasibility Study of a New Zinc-Air Battery Concept Using Flowing Alkaline Electrolyte", Intersociety Energy Cony. Eng. Cont, vol. 2, pp. 1066-1172 (Aug. 25, 1986).
Suppl. European Search Report of EP Appl No. 09751078.8 dated Jul. 27, 2012 (6 pages).

* cited by examiner

ELECTROCHEMICAL CELL, AND PARTICULARLY A CELL WITH ELECTRODEPOSITED FUEL

This is a divisional application of U.S. application Ser. No. 12/385,489 filed Apr. 9, 2009, which claims priority to U.S. Provisional Application No. 61/054,364, filed May 19, 2008, and U.S. Provisional Application No. 61/086,241, filed Aug. 5, 2008, the entirety of each of which are hereby incorporated by reference.

FIELD

The present application relates to an electrochemical cell for generating power, and more particularly a cell using eletrodeposited fuel.

BACKGROUND

Electrochemical cells using metal as the fuel are known. Examples of such devices are shown, for example, in U.S. Pat. Nos. 7,276,309; 6,942,105; 6,911,274 and 6,787,260, which are incorporated herein in their entirety. A short list of disadvantages of these previous embodiments includes: the buildup of precipitated reaction products in the anode space and the cathode space, issues related to the feed of the solid particle fuel, the sluggish rate of net oxidation of the fuel due to the increased concentration of oxidized fuel in the vicinity of the as yet unoxidized fuel.

Metal-air cells or batteries that do not use particulates are also known. A metal-air cell typically comprises an anode of which metal fuel is oxidized, an air breathing cathode at which oxygen from ambient air is reduced, and an electrolyte for supporting reactions of the oxidized/reduced ions.

The present application also endeavors to provide an effective and improved way of charging or re-charging the cell, which may be used with any type of cell where the fuel is electrodeposited.

SUMMARY

One aspect of the invention provides a method for operating an electrochemical cell. The cell comprises a first electrode comprising a series of permeable electrode bodies arranged in spaced apart relation, and a second electrode spaced apart from the first electrode. A charging electrode is spaced apart from the first electrode. The charging electrode is selected from the group consisting of (a) the second electrode, and (b) a third electrode. That is, the charging electrode may the second electrode, or it may be third electrode in the system. An ionically conductive medium communicates the electrodes and comprises reducible fuel ions. The ions may be in free ionic form, or in a molecular or complexed form. The method comprises:

A. charging the electrochemical cell by:
  i. applying an electrical current between the charging electrode and at least one of the permeable electrode bodies with the charging electrode functioning as an anode and the at least one permeable electrode body functioning as a cathode, such that the reducible fuel ions are reduced and electrodeposited as fuel in oxidizable form on the at least one permeable electrode body;
  ii. said electrodeposition causing growth of the fuel among the permeable electrode bodies such that the electrodeposited fuel establishes an electrical connection between the permeable electrode bodies; and
  iii. removing the electrical current to discontinue the charging;

B. generating electrical current using the electrochemical cell by oxidizing the fuel on the permeable electrode bodies of the first electrode functioning as an anode and reducing an oxidizer at the second electrode functioning as a cathode whereby electrons are generated for conduction from the first electrode to the second electrode via a load, and the oxidized fuel ions and reduced oxidizer ions react to form a by-product.

Another aspect of the invention provides a method for charging an electrochemical cell. The cell comprises a first electrode comprising a series of permeable electrode bodies arranged in spaced apart relation, and a second electrode spaced apart from the first electrode. A charging electrode is spaced apart from the first electrode. The charging electrode is selected from the group consisting of (a) the second electrode and (b) a third electrode. An ionically conductive medium communicates the electrodes and comprises reducible fuel ions.

The method comprises:
  i. applying an electrical current between the charging electrode and at least one of the permeable electrode bodies with the charging electrode functioning as an anode and the at least one permeable electrode body functioning as a cathode, such that the reducible fuel ions are reduced and electrodeposited as fuel in oxidizable form on the at least one permeable electrode body;
  ii. said electrodeposition causing growth of the fuel among the permeable electrode bodies such that the electrodeposited fuel establishes an electrical connection between the permeable electrode bodies; and
  iii. removing the electrical current to discontinue the charging.

In a non-limiting embodiment, the electrode bodies may be coupled in parallel with one another and the load. At least one current isolator may be connected between the terminal electrode body and the other electrode bodies and the load. The at least one current isolator prevents conduction to the other electrode bodies of the electrical current applied to the terminal electrode body during charging. Also, the at least one current isolator permits conduction of the electrical current from the terminal electrode body to the load when using the electrochemical cell.

Other aspects of the present invention will become apparent from the following detailed description, the accompanying drawings, and the appended claims.

DETAILED DESCRIPTION

The principles of the present invention may be broadly applied to any electrochemical cell where a fuel, such as a metal fuel, is electrodeposited on the anode. Such cells may include batteries, such as metal-air batteries, for example. The Figures illustrate embodiments of various aspects of the inventions claimed. These embodiments are in no way intended to be limiting, and are intended only as examples for facilitating an understanding of the principles of the claimed inventions.

For example, one non-limiting example of an electrochemical cell with which the principles of the present invention may be used is shown in U.S. Provisional Appln. Ser. No. 61/136,330, filed Aug. 28, 2008, the entirety of which is incorporated herein by reference.

FIGS. 1-4 illustrate another example of an electrochemical cell system, generally indicated at 1, according to embodiments of the present invention. As illustrated and described below, the electrochemical cell system 1 includes a plurality of electrochemical cells 10, and two of the electrochemical cells 10 are more clearly shown in cross-section in FIG. 4. Although a total of four electrochemical cells are illustrated in this embodiment, more or less electrochemical cells may be included in the system. Indeed, in certain applications, a large two-dimensional array of parallel electrochemical cells can be created to provide for increased power output. In other embodiments, the cells may be in series. The illustrated embodiment is not intended to be limiting in any way and is merely an example.

Figure 1:
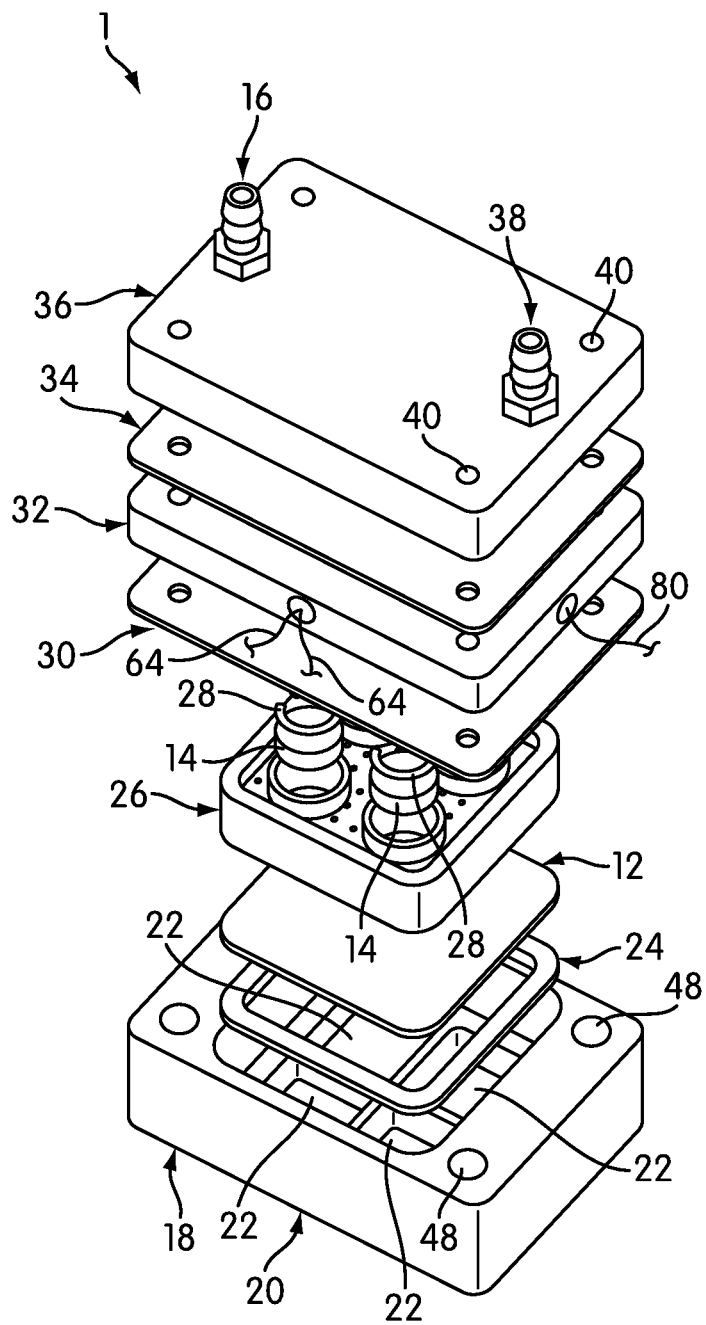
FIG. 1 is an exploded, perspective view of an embodiment of an electrochemical cell system that includes four electrochemical cells.
Figure 2:
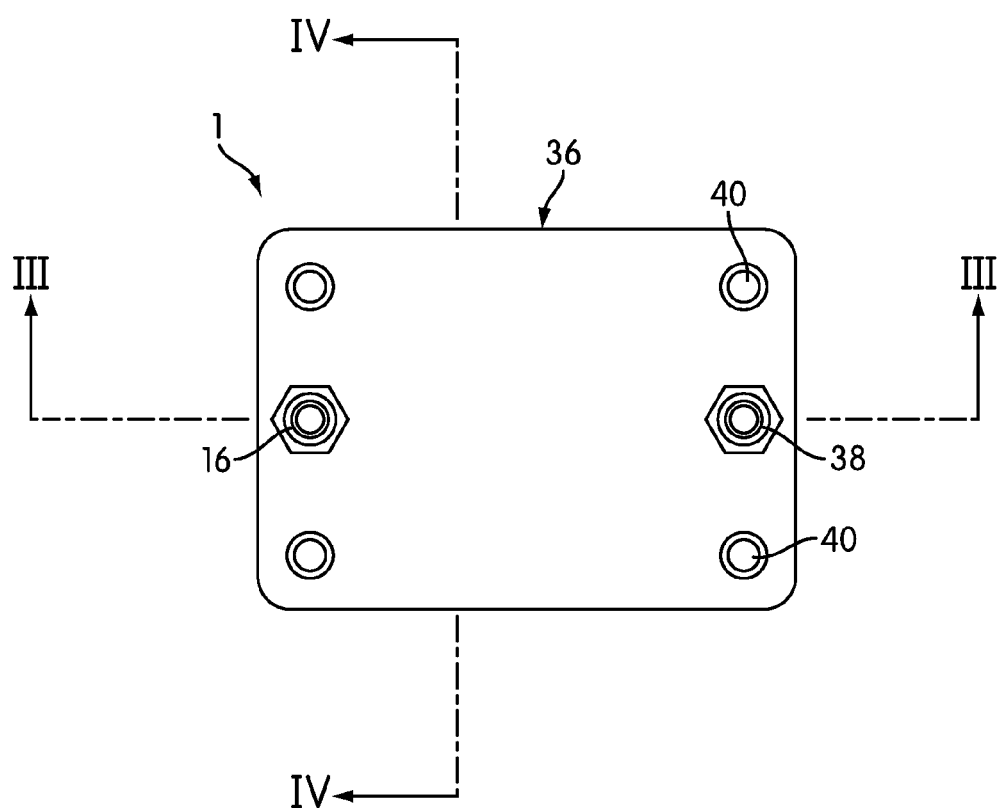
FIG. 2 is a top view of the electrochemical cell system of FIG. 1.

As discussed in further detail below, each electrochemical cell 10 has a cathode 12, and an anode 14 (two anodes are shown in FIG. 1, each representing one of the electrochemical cells 10). As used herein, the anode 14 is where the fuel of the system is oxidized. As discussed in further detail below, the anode 14 is comprised of the fuel in the form of solid fuel electrodeposited on an electroconductive electrode body, but may be generally referred to as the anode, even when no fuel is present. The electrochemical cell system 1 may also include an inlet 16, and an oxidizer input 18, which allows an oxidizer to enter the system. In some embodiments, the cell may be a battery such that the fuel is self-contained, such as a metal-air battery, and thus there is no need for connecting the input to a separate fuel source. Likewise, the oxidizer may be self-contained also.

The electrochemical cell system 1 includes a lower base 20 that is configured to support the components of the electrochemical cell system 1 described herein. For descriptive purposes, the electrochemical cell system 1 is illustrated and described as having an orientation in which the lower base 20 is located at the "bottom" of the system 1, but it should be understood that the system 1 may be oriented in any way. Thus, any directional references are made with regard to the orientation as shown in the drawings, and are not intended to limit a working embodiment to any particular orientation. As discussed in further detail below, the cathode 12 for each electrochemical cell is a single cathode that is supported by the lower base 20. The lower base 20 defines an opening 22 for each electrochemical cell 10, and each opening is configured to be the oxidizer input 18 for the respective electrochemical cell, as discussed in further detail below. As shown in FIG. 1, a gasket 24 is located between the lower base 20 and the cathode 12 so as to provide a seal between the cathode 12 and the lower base 20. The gasket 24 is configured to substantially prevent any fluids, such as an electrolyte, from leaking out of the system.

In other embodiments, the cathode for each cell may be provided by smaller, separate, and individual cathodes instead of a larger "single cathode." Thus, the use of a single cathode is not intended to be limiting.

The lower base 20 is also configured to receive an anode holder 26 that is constructed and arranged to hold the anode 14 (and in the illustrated embodiment four anodes are provided). The anode holder 26 will be discussed in greater detail below. The anode 14 may be retained in the anode holder 26 by a retainer 28, such as a clip, although any suitable securing device may be used. The lower base 20 and the anode holder 26 are configured so that their respective top surfaces are substantially coplanar, i.e., reside in the same plane, upon assembly of the system. As further illustrated in FIG. 1, the electrochemical cell 10 includes a gasket 30 that extends across the anode holder 26 and the lower base 20.

A transition member 32 is disposed on top of the gasket 30, and a further gasket 34 is disposed on top of the transition member 32. The transition member 32 is discussed in further detail below. A manifold 36 is in contact with the gasket 34 on an opposite side of the transition member 32. The manifold 36 includes the inlet 16 and an outlet 38.

As an option, the outlet 38 may be connected to a system that may be used to separate the by-product of the electrochemical reactions of the electrochemical cell system 1 from the electrolyte, although the by-product does not need to be separated for the electrolyte to be reused or re-circulated. The by-product may be separated from the electrolyte to prevent clogging of the cell in some embodiments, but it is not necessary. The separated by-product may optionally be re-introduced into the electrolyte for reduction on the anode during re-charging. In other embodiments, the by-product may remain in solution or as a precipitate in the electrolyte within the cell, which may be used for reduction on the anode for re-charging the cell. In such embodiments, the inlet 16 and outlet 38 may be connected to a circulation pump to generate a re-circulating electrolyte flow with no separation of the by-product.

The entire assembly may be clamped together with a plurality of fasteners (not shown) that may be inserted into aligned holes 40 provided in the various structures, or with any other suitable clamp so that the gaskets 24, 30, 34 seal the various components of the electrochemical cell system 1 together to substantially prevent fluids from leaking out of the electrochemical cell system 1. Although the overall system is illustrated as having a substantially rectangular shape, any suitable shape and configuration may be used and the illustrated configuration is not limiting.

Figure 5:
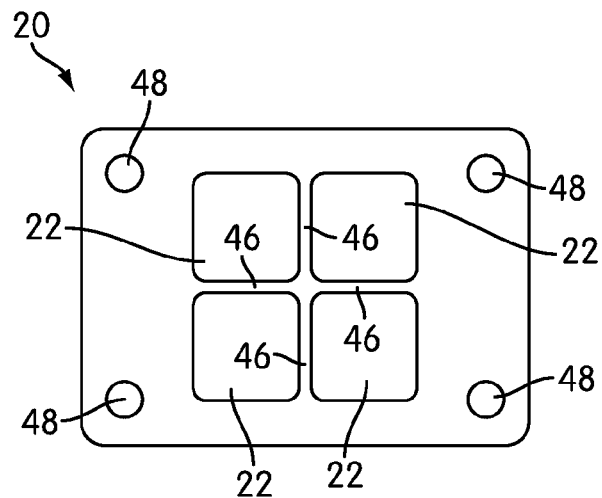
FIG. 5 is a bottom view of a lower base of the electrochemical cell system of FIG. 1.
Figure 6:
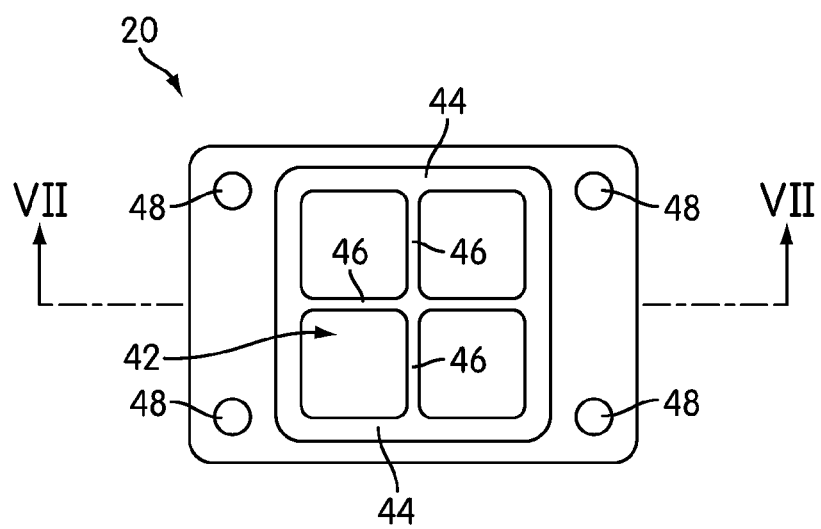
FIG. 6 is a top view of the lower base of FIG. 5.
Figure 7:
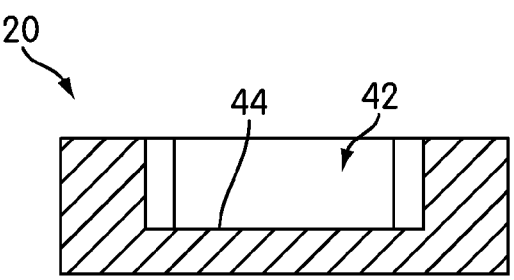
FIG. 7 is a cross-sectional view of the lower base of FIG. 6, taken along line VII-VII.

The lower base 20 is shown in greater detail in FIGS. 5-7. As stated above, the lower base 20 is configured to support the cathode 12. More specifically, the lower base 20 includes a cavity 42 that provides a support surface 44 that is configured to support the cathode 12. The openings 22 discussed above extend all the way through the lower base 20. Ribs 46 that separate the openings 22 also partially define the support surface 44 and are configured to support a center portion of the cathode 12. Thus, the cathode 12 is disposed in the cavity 42 and engaged with the supporting surface 44 (and the gasket 24 described above) so that the cathode 12 is exposed through the four "windows" 22 defined by the ribs 46. This configuration allows for a single cathode 12 to be simultaneously used by all four electrochemical cells 10, as discussed in further detail below. The lower base 20 may also include threaded openings 48 that are configured to receive the fasteners that are used to clamp the entire electrochemical cell system 1 together. The lower base 20 may be made from any suitable non-conductive material, such as plastic.

The cathode 12 generally comprises a porous body covered on the outer side by a gas permeable layer through which an oxidizer may diffuse, but the electrolyte may not pass through. That is, the layer is gas permeable, but not permeable by the electrolyte (i.e., it is gas permeable but not liquid permeable). As an option, the porous body may also be covered on the inner side by a liquid permeable layer through which the electrolyte may pass through so that the electrolyte may contact the porous body. The porous body of the cathode 12 has a high surface area and comprises a catalyst material that has a high activity for an oxidizer reduction reaction. In the illustrated embodiment, the cathode 12 has a substantially planar configuration. As illustrated in FIG. 1, the cathode 12 also has a rectangular, more specifically square, configuration. This illustrated configuration, however, is not limiting, and the cathode 12 could have any other shape or configuration other than that illustrated, any may have any composition of materials.

The cathode may be a passive or "breathing" cathode that is passively exposed, such as through the windows or openings 22, to the oxidizer source (typically oxygen present in ambient air) and absorbs the oxidizer for consumption in the electrochemical cell reactions. That is, the oxidizer, typically oxygen, will permeate from the ambient air into the cathode 12. Thus, the oxidizer need not be actively pumped or otherwise directed to the cathode, such as via an inlet. Any part of the cathode 12 by which the oxidizer is absorbed or otherwise permeates or contacts the cathode 12 may be generically referred to as an "input." The term input may broadly encompass all ways of delivering oxidizer to the cathode (and that term may similarly be used with reference to any way of delivering fuel to the anode). In the illustrated embodiments, the openings 22 in the lower base 20 define the inputs 18 for oxidizer, because the openings allow the oxidizer to come into contact with the cathode 12.

The cathode 12 includes a catalyst material, such as manganese oxide, nickel, pyrolized cobalt, activated carbon, platinum, or any other catalyst material or mixture of materials with high oxygen reduction activity in the electrolyte for catalyzing reduction of the oxidizer, which will be discussed below. The porous body of the cathode 12 may comprise the catalyst material. In an illustrated embodiment, and particularly for portable applications, the cathode 12 may have a thickness of about 1 mm or less, and may have a length of about 3.7 cm and a width of about 3.7 cm. Of course, such dimensions are provided as examples and are not intended to be limiting in any way. Such cathodes are commercially available and therefore a more detailed description of the cathode is not provided herein.

Figure 8:
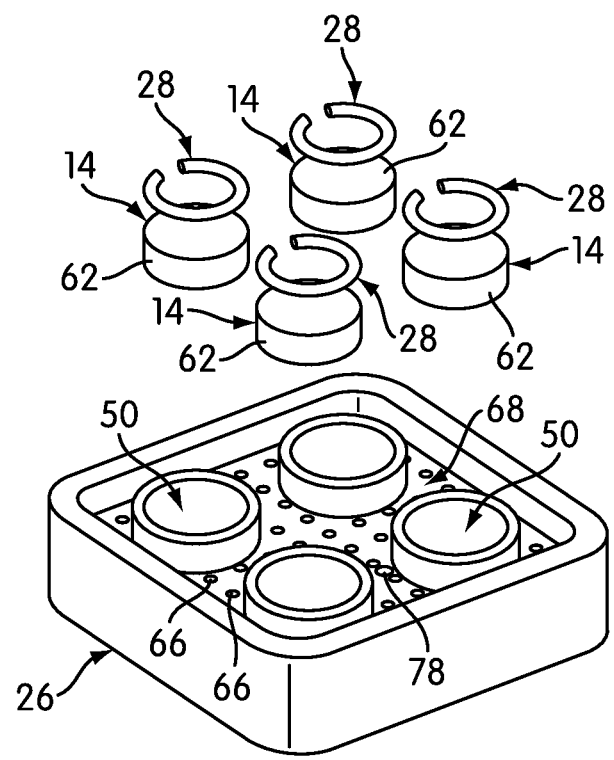
FIG. 8 is an exploded, perspective view of an anode holder and a plurality of anodes of the electrochemical cell system of FIG. 1.
Figure 9:
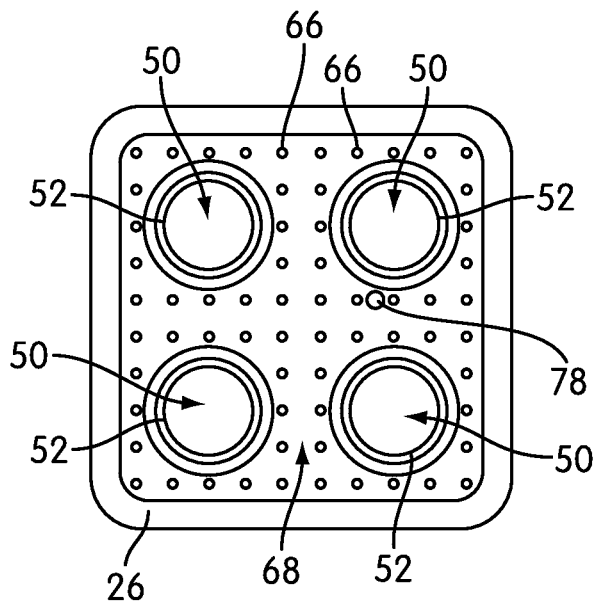
FIG. 9 is a top view of the anode holder of FIG. 8.
Figure 10:
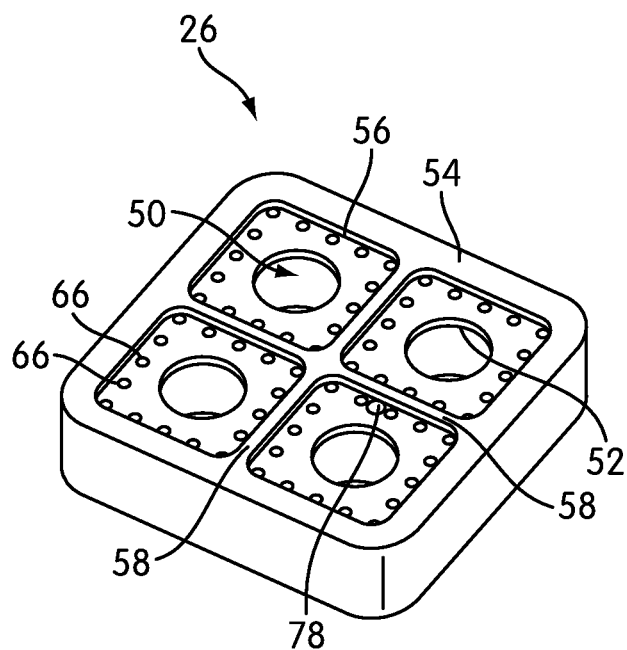
FIG. 10 is a bottom perspective view of the anode holder of FIG. 8.

Details of the anode holder 26 are shown in FIGS. 8-10. As shown in FIG. 8, each anode 14 is received by an anode receiving space or cavity 50 of the anode holder 26. As will be discussed in detail below, multiple spaced apart electrode bodies are used to constitute each anode, as illustrated in FIGS. 14-20, for example. Similar to the support surface 44 of the lower base 20, a support surface 52 (shown in FIG. 9) is provided at a lower end of the anode receiving space 50. The support surface 52 is configured to support the anode 14 and prevent the anode from contacting the cathode 12 after the electrochemical cell system 1 has been assembled. As discussed above, each anode 14 may be retained within the anode receiving space 50 by the retainer 28. The retainer 28 prevents the anode 14 from "floating" within the anode receiving space 50 after the system has been filled with electrolyte. The retainer 28 may be a resilient material that presses against the anode holder 26 in the anode receiving space 50 for an interference-type fit. The retainer 28 may be removed from the anode holder 26 so that the anode 14 may be removed from the anode holder 26, if needed. In other variations, the anode(s) may be retained by any suitable means, such as being retained in a non-removable manner.

FIG. 10 illustrates a bottom side of the anode holder 26, i.e., the side that faces the cathode 12. The bottom side of the anode holder 26 includes a bottom surface 54 that is configured to directly contact an upper surface of the cathode 12. As shown in FIG. 10, a plurality of recesses 56 are provided in the bottom surface 54 so as to form ribs 58. The ribs 58 of the anode holder 26 are generally aligned with the ribs 46 of the lower base 20 upon assembly of the system 1. The ribs 58 substantially separate the four electrochemical cells 10 from each other into four different chambers. The ribs 58 may also be configured to substantially prevent the electrolyte from flowing between the different electrochemical cells 10. The delineation that is provided by the ribs also allows for a single cathode 12 to be used for all four electrochemical cells 10 (or whatever number may be used).

Each recess 56 in the anode holder 26 corresponds to one of the electrochemical cells 10, and the depth of each recess 56 defines a gap 60 (see FIGS. 13 and 14) between the anode 14 and the cathode 12 when the electrochemical cell system 1 is assembled. The gap 60 will typically be an essentially empty gap for permitting fluid flow from the anode 14 to the cathode 12 and then back out the return channels 66 (discussed below). Preferably, the gap 60 is essentially constant, but in some configurations it may be altered. The fluid flow into, through, and out of the gap 60 will be discussed in further detail below.

In an embodiment, the gap 60 between the anode 14 and the cathode 12 may have channels or other features for facilitating flow of electrolyte and oxidized fuel (as discussed below), but does not have a proton exchange membrane, and instead allows fluid flow of the electrolyte and oxidized fuel into the gap 60, as discussed below. For example, the gap 60 could be occupied by a porous, non-reactive, and non-conductive spacer that still allows the flow, such as a spacer having a honeycomb configuration or a porous frit. Preferably, the gap 60 is an open space that allows for convective flow, as discussed in further detail below.

In the illustrated embodiment, the anode 14 has a substantially cylindrical configuration. However, this configuration is not intended to be limiting, and the anode could have any other shape or configuration other than that illustrated. The anode 14 comprises the multiple electrode bodies as discussed below. Each body is configured to allow the electrolyte to flow through it, while enabling fuel to be electrodeposited thereon during re-charging. It is the combination of the body or bodies and the captured fuel particles that comprise the anode 14. In an embodiment, each body may be a carbon filter that is made from carbon fiber, a tightly woven mesh of brass, bronze, stainless steel, nickel, monel, any other high conductivity material, or any other material.

Other materials or methods of forming the electrode bodies of anode 14 may be used. For example, the body may include channels, grooves, bores, pores, mesh, or any other formations able to receive electrodeposited particles of the fuel from the electrolyte flowing through or over it. In an embodiment, a body may include one or more screens of brass, bronze, stainless steel, nickel, monel, or any other high conductivity material. A body may be any other conductor that can act as a reduction site in electrodeposition.

Figure 3:
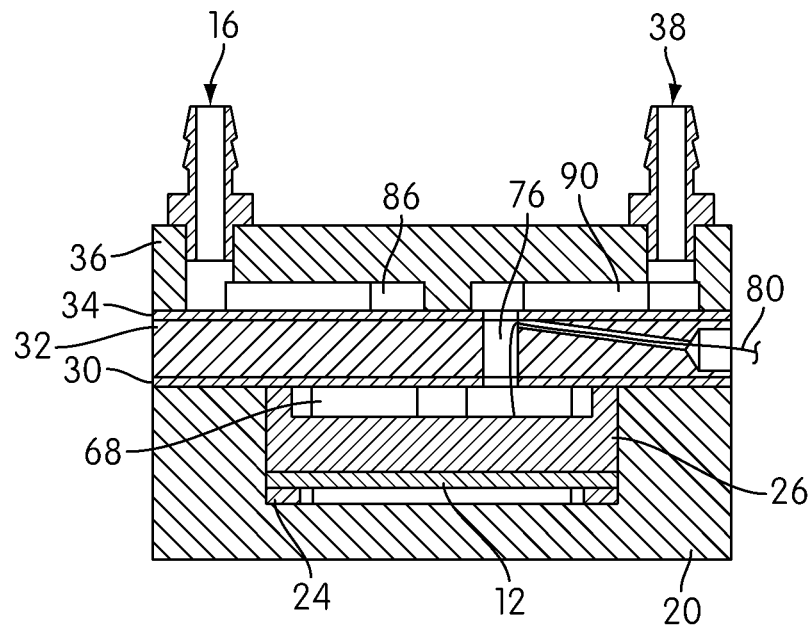
FIG. 3 is a cross-sectional view of the electrochemical cell system of FIG. 2, taken along line III-III.
Figure 13:
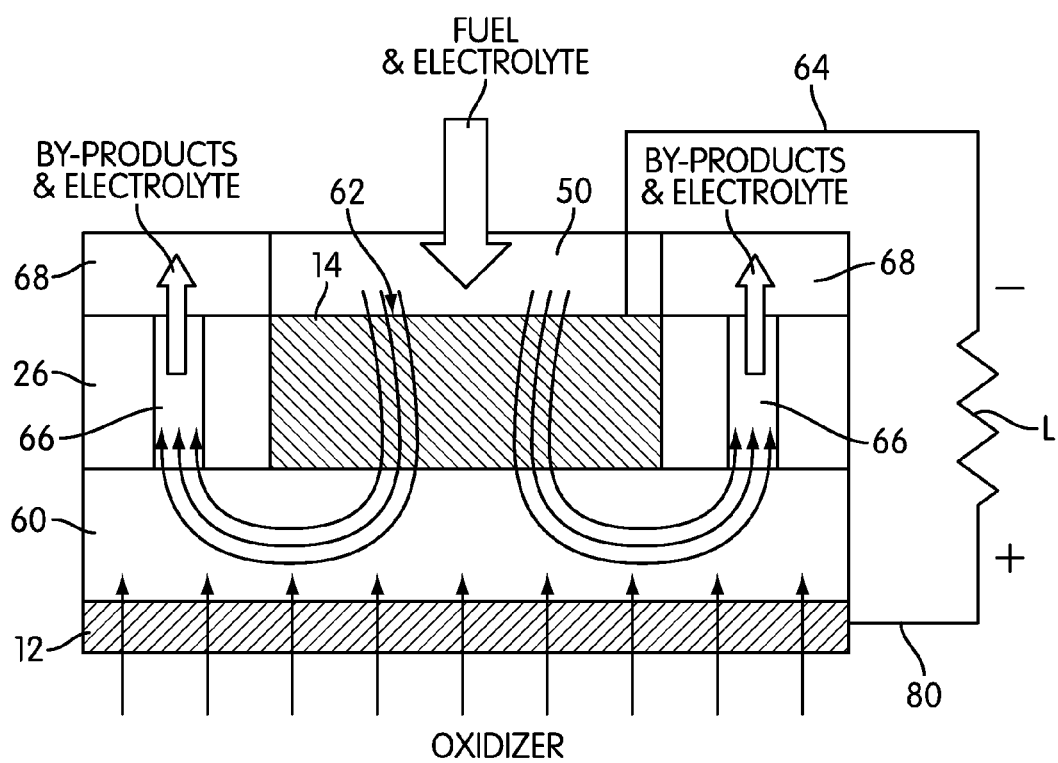
FIG. 13 is a schematic view of flows within the electrochemical cells of FIG. 1.

In addition to holding the anode 14 in place, the retainer 28 may be used to provide an electrical connection to a load L via an electrical lead 64, such as a wire (shown in FIG. 3 and represented schematically as a negative (−) terminal in FIG. 13). The electrical lead 64 may be routed from the retainer 28 and out of the electrochemical cell 10 via the transition member 32, as discussed in further detail below. In embodiments where a conductive screen is used as at least part of the anode 14, the electrical lead 64 may be connected directly to the screen.

Oxidation of the fuel at the anode 14 provides oxidized fuel ions ionically conducted by the electrolyte. By retaining the fuel on the anode's electrode bodies, a continuous source of released or liberated electrons and resulting fuel ions may be provided.

As illustrated in FIGS. 8-10, each electrochemical cell 10 has a plurality of return channels 66 that circumferentially surround and extend parallel to the anode receiving space 50 in the anode holder 26. Each return channel 66 has a cross-sectional area that is substantially smaller than the cross-sectional area of the anode receiving space 50. Although a total of sixteen channels 66 are illustrated for each electrochemical cell 10, more or less channels having any suitable cross-section may be used. The channels 66 are sized to provide a positive return flow of the electrolyte carrying the by-product of the electrochemical reaction carried out in the electrochemical cell 10 to the electrolyte and by-product outlet 38. Specifically, each channel 66 communicates the gap 60 to a return space 68 that is defined by the anode holder 26 and the gasket 30 that seals a top side of the anode holder 26; and this return space 68 is communicated to the outlet 38 as discussed below. In the illustrated non-limiting embodiment, the return space 68 is a common space shared by all four electrochemical cells 10 of the electrochemical cell system 1. Further, walls providing an extension of the anode receiving spaces 50 to the transition member 32 separate the return space 68 from the anode receiving spaces 50 in this region. Such a configuration allows for a single return out of the electrochemical cell system 1, as discussed in further detail below. The anode holder 26 is preferably made from a nonconductive, lightweight material, such as plastic, although any suitable material may be used.

Other suitable constructions and configurations for the holder 26, the channels 66 and the return space 68 may also be used and the illustrated embodiment is not regarded as limiting.

Figure 4:
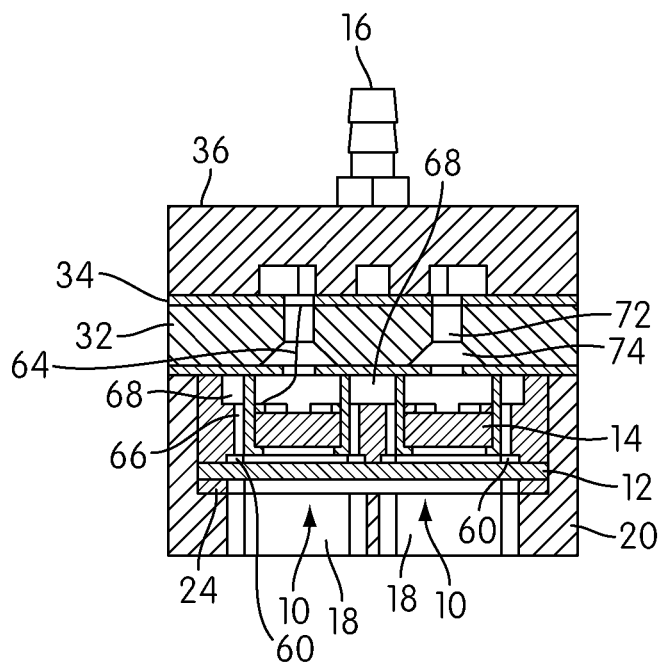
FIG. 4 is a cross-sectional view of the electrochemical cell system of FIG. 2, taken along line IV-IV.
Figure 11:
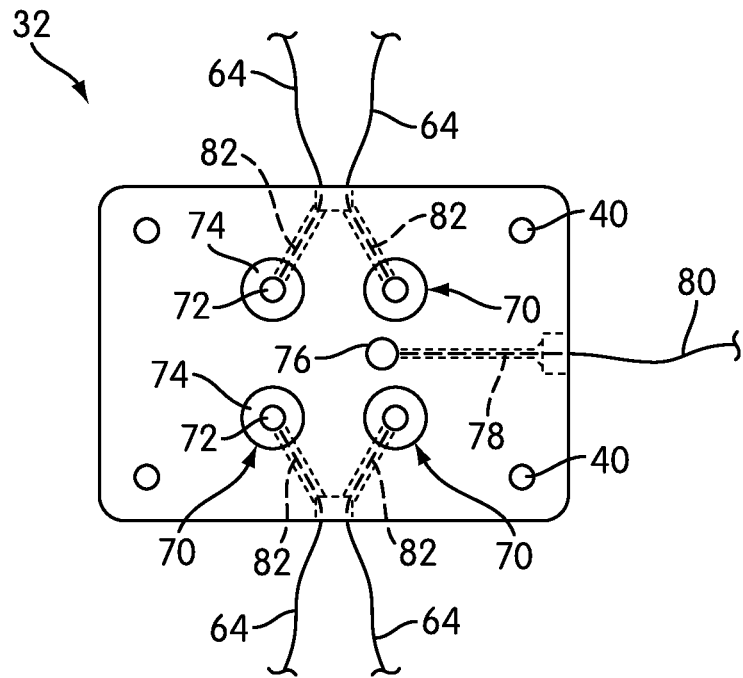
FIG. 11 is a bottom view of a manifold of the electrochemical cell system of FIG. 1.

As illustrated in FIG. 11, the transition member 32 includes a plurality of supply ports 70. Each of the ports 70 is configured to be aligned with each anode receiving space 50 of the anode holder 26, and, hence, with each respective anode 14 upon assembly of the electrochemical cell system 1. As illustrated in FIGS. 4 and 11, an upstream section 72 of the port 70 is substantially cylindrical in shape and has a substantially constant diameter, and a downstream section 74 of the port 70 is substantially frustoconical in shape, such that the diameter at the downstream-most position is greater than the diameter that is connected to the upstream section 72. The term "upstream" as used herein is intended to mean closer to the input 16 than the anode 14, and the term "downstream" as used herein is intended to mean closer to the anode 14 than the input 16. By having the downstream section 74 of the port 70 in the transition member 32 increase in diameter and cross-sectional area along the flow path of the fuel and electrolyte, a pressure drop may be created. The creation of the pressure drop just upstream of the anode 14 may allow for a more constant flow of the electrolyte and any fuel precipitates as they enter the anode 14.

The transition member 32 also includes a single return port 76 that is configured to allow the electrolyte and the by-products of the electrochemical reactions in the electrochemical cells 10 to flow from the return space 68 in the anode holder 26 towards the outlet 38. Although a single return port 76 is shown, it is understood that additional ports may be used to provide passageways for the flow of the electrolyte and by-product away from the return space 68 and anodes 14. As shown in FIG. 11, the return port 76 is connected to a channel 78 that is configured to receive an electrical lead 80, e.g., wire, that may be connected to the cathode 12 and to the external load L (which is also represented schematically as a positive terminal in FIG. 13). Although the electrolyte and by-products are not likely to exit the electrochemical cell system 1 via the channel 78 due to the increase in pressure that would be created by flow through the channel 78, suitable seals may be used to prevent the electrolyte and by-products from leaking into the channel 78 and out of the electrochemical cell system 1.

The electrical lead 80 for the cathode 12 may be routed through the channel 78 of the transition member 32, into the return port 76 of the transition member 32, through the return space 68 of the anode holder 26, through the anode holder 26 through one of the channels 66 or though a separate channel 82 that is configured for the electrical lead 80, through the gap 60, and into contact with the cathode 12. Of course, other paths may be used to connect the load to the cathode 12. The illustrated embodiment is not intended to be limiting in any way.

As shown in FIG. 11, an electrical lead channel 82 may be provided for each electrical lead 64 that connects each anode 14 to the external load. The electrical lead channels 82 may be similar in configuration as the channel 78 described above. The electrical lead 64 for each anode 14 may be routed through the channel 82, into the port 70 and to the retainer 28 of the anode 14, thereby providing an electrical connection between the anode 14 and the external load. Of course, other paths may be used to connect the load to the anode 14, and the illustrated embodiment is not intended to be limiting in any way. Connections between the anode 14 and an external load L and the cathode 12 and the external load L are schematically illustrated in FIG. 13.

Figure 12:
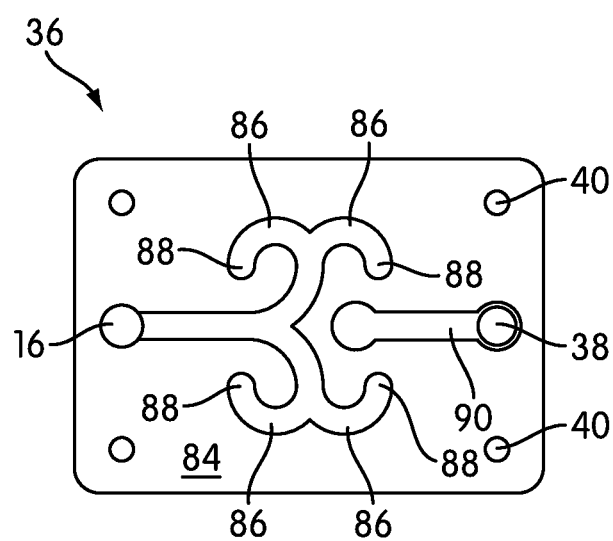
FIG. 12 is a bottom view of a cover of the electrochemical cell system of FIG. 1.

FIG. 12 illustrates a bottom (i.e., internal) side 84 of the manifold 36. The bottom side 84 includes a plurality of inlet pathways 86 that are all connected to the inlet 16. The pathways 86 are closed off by the top surface of the gasket 34 that is located between the manifold 36 and the transition member 32. Each of the pathways 86 has a distal end 88 that is connected to one of the ports 70 of the transition member 32 when the electrochemical cell system 1 is assembled. As shown, each pathway 86 may be curved so that there is no place for any precipitates in the electrolyte to collect, i.e., there are no flow "dead spots" that may clog the flow of the electrolyte and any precipitated by-product particles over time. This also increases turbulence in the flow to help keep any by-product agitated and suspended in the flow. The bottom side 84 of the manifold 36 also includes a single outlet pathway 90 that is configured to connect the return port 76 of the transition member 32 to the electrolyte and by-product outlet 38. Although the outlet pathway 90 is illustrated as being straight, it may be curved like the inlet pathways, although such a configuration is generally not necessary.

Each electrode body of the anode 14 may optionally be communicated to the input 16 for receiving the flow of the electrolyte. In an embodiment, the inlet is aligned directly with the anode 14. Preferably, the fuel and electrolyte source comprises a single source with the fuel mixed with the electrolyte. However, it is also within the scope of the present invention to use separate sources for the fuel and electrolyte and deliver them separately to electrochemical cell 10 and mix them just upstream of the anode 14. Or the cell may normally operate as a battery, with no separate source of fuel, or with an option to inject fuel particulates as a supplement if additional fuel is needed or desired for a complete recharging. It is also possible to omit any external source of fuel, and have the cell be a self-contained battery. Also, as mentioned above, the fuel inlet may receive re-circulated electrolyte from the return channels, rather than flowing to any separate container, reservoir or separator.

In the illustrated embodiment, the inlet is in the form of the pathway 86 that is formed in the manifold 36 and fluidly communicates the input 16 to the anode 14. As discussed above, the pathway 86 is in fluid communication with the input 16, as well as the port 70 of the manifold for flowing the electrolyte to the transition member 32. Any suitable connections, conduits, channels, or passages may be used to flow electrolyte to the anode 14.

During operation, fuel oxidation occurs to oxidize the fuel into at least oxidized fuel ions that remain in the electrolyte and electrons for conduction by the anode 14 to the cathode 12 through the external load L, which is connected to the anode 14 and cathode 12 as shown in FIG. 13. The oxidation reaction will be discussed below.

The electrochemical cell 10 may be configured to provide a pressure differential that creates a flow of the electrolyte through the anode 14, into the gap 60 and towards the cathode 12, radially away from the anode 14, and back into the channels 66 in the anode holder 26. Then, the electrolyte flows into the return space 68, through the return port 76 in the transition member 32, then through the passageway 90 found in the manifold 36, and out the electrolyte and by-product outlet 38.

Within the gap 60, a transport flow of the electrolyte flows across the gap 60 from the anode body 62 of the anode 14 to the cathode 12. The term "transport flow" refers to a fluid flow of the electrolyte across the gap, which transports the oxidized fuel ions away from the anode 14 and towards the cathode 12. Thus, the ions are transported convectively by the flowing electrolyte, rather than relying solely on conduction or diffusion within the electrolyte. In contrast, in electrochemical cells with proton exchange membranes, the membrane itself is an electrolyte that transports the oxidized fuel ions by conduction. Here, in the illustrated embodiment the primary direction of the transport flow is away from the anode 14 to the cathode 12 and then radially outward and back into the return channels 66, as opposed to the prior art approach where two streams of oxidizer and fuel are caused to flow along a path parallel to the anode and cathode. Stated differently, a vector or gradient describing the flow leaving the anode 14 would initially be primarily oriented from one electrode to the other (as opposed to being oriented parallel to the electrode) and then be primarily oriented to the return channels 66 in a return direction substantially parallel but opposite to the initial vector and radially outward of the flow leaving the anode 14, as shown in FIG. 13. This flow configuration is optional.

Although the electrochemical cell system 1 may be passively operated, such as by gravity feed or by motion of the device (e.g., for a portable cell, such as in a watch, kinetic energy from motion of the user could be used to generate the flow), in an embodiment, a flow generator, such as a small pump, may be used to generate flow of the electrolyte. The pump may be any suitable pump, such as a piezoelectric pump, a centrifugal pump, a gear pump, a peristaltic pump, etc. The pump may be used in various configurations and in electrochemical cells 10 of various sizes. The flow generator could have any construction or configuration. Thus, the term flow generator is intended to broadly encompass both active powered and passive non-powered mechanisms for generating flow.

As can be seen from FIG. 13, the initial flow leaving the anode 14 and the return flow entering the return channels 66 run counter to one another in an adjacent and overlapping manner (referred to as counterflow). Preferably, but not necessarily, the return channels 66 peripherally surround the anode 14 and its receiving space 50 so that the initial flow leaving the anode 14 is surrounded by and within the return flow flowing towards and into the return channels 66. Preferably, but not necessarily, the anode 14 is at or aligned with the center of the geometry defined by the return channels, thus providing for an even distribution of the flow to all the return channels 66.

Any such electrically powered flow generator may optionally be coupled directly or indirectly to the anode and cathode so that it can draw power, thus providing a self-powering electrochemical cell 10. A battery or other alternative power source may be provided to initially power such a flow generator, and a switch may be used to enable the generator to draw power from the anode and cathode or the alternative power source as needed. A controller may switch the flow generator from the initial power source to the electrochemical cell output power either (i) at a predetermined time after the electrochemical cell operation has started, or (ii) when it detects that the electrochemical cell power output has reached a level sufficient to self-power the flow generator.

The oxidizer may be delivered to the cathode 12 by a passive transport system. For example, where oxygen present in ambient air is the oxidizer, simply exposing the cathode 12 to ambient air via the openings 22 may be sufficient to allow diffusion/permeation of oxygen into the cathode porous body (and the portion where the diffusion enters the cathode may be regarded as the oxidizer input 18). Other suitable oxidizers may be used (including liquid oxidizers or oxidizers solvated in an electrolyte) and embodiments described herein are not limited to the use of oxygen as the oxidizer.

In other embodiments, an optional pump, such as an air blower, may be used to deliver the oxidizer to the cathode 12 under pressure. The oxidizer source may be a contained source of oxidizer. Likewise, when the oxidizer is oxygen from ambient air, the oxidizer source may be broadly regarded as the delivery mechanism, whether it be passive (e.g., access openings 22 for the air) or active (e.g., pumps, blowers, etc.), by which the air is permitted to flow to the cathode 12. Thus, the term "oxidizer source" is intended to encompass both contained oxidizers and/or arrangements for passively or actively delivering oxygen from ambient air to the cathode 12.

During operation, when the anode 14 and the cathode 12 are coupled to the load L, reaction among at least the oxidizer and the electrons flowing to the cathode 12 will occur at the cathode, thus reducing the oxidizer. The reduced oxidizer ions may react with the oxidized fuel ions to complete the electrochemical cell reaction. The oxidizer reduction reaction will be discussed below.

The fuel may be a metal, such as, for example, iron, zinc, aluminum, magnesium, or lithium. By metal, this term is meant to encompass all elements regarded as metals on the periodic table, including but not limited to alkali metals, alkaline earth metals, lanthanides, actinides, and transition metals, either in atomic or molecular form when collected on the electrode body. For example, the fuel may be flakes, small spheres, or dendrites of zinc. The particles may be as small as about 1 µm and as large as about 1 mm or even larger. In an embodiment, the particles have an average size (i.e., effective diameter) of about 300 µm. However, the present invention is not intended to be limited to any specific fuel, and others may be used. For example, the fuel may be comprised of a redox active organic solid that is soluble in the oxidized state and insoluble in the reduced state.

The electrolyte may be an aqueous solution. Examples of suitable electrolytes include aqueous solutions comprising sulfuric acid, phosphoric acid, triflic acid, nitric acid, potassium hydroxide, sodium hydroxide, sodium chloride, potassium nitrate, or lithium chloride. The electrolyte may also use a non-aqueous solvent or an ionic liquid. Any ionically conductive medium may be used. In the non-limiting embodiment described herein, the electrolyte is aqueous potassium hydroxide.

To limit or suppress hydrogen evolution at the anode, salts may be added to retard such a reaction. Salts of stannous, lead, copper, mercury, indium, bismuth, or any other material having a high hydrogen overpotential may be used. In addition, salts of tartrate, phosphate, citrate, succinate, ammonium or other hydrogen evolution suppressing additives may be added. In an embodiment, metal fuel alloys, such as Al/Mg may be used to suppress hydrogen evolution. These are optional and may be omitted.

Turning to the specific reactions in one non-limiting embodiment, potassium hydroxide is used as the electrolyte (which is alkaline), zinc (Zn) particles are used as the fuel, and oxygen ($O_2$) from ambient air is used as the oxidizer.

At the anode, the zinc is oxidized, as represented by equation (1):

$$Zn + 4OH^- \rightarrow Zn(OH)_4^{2-} + 2e^- \quad (E° = -1.216V) \quad (1)$$

At the cathode, oxygen is reduced, as represented by equation (2):

$$2e^- + \tfrac{1}{2}O_2 + H_2O \rightarrow 2OH^- \quad (E° = 0.401V) \quad (2)$$

In solution, the following reaction occurs as represented by equation (3):

$$Zn(OH)_4^{2-} \rightarrow ZnO + H_2O + 2OH^- \quad (3)$$

Thus, the zinc is oxidized at the anode and its positive ion ($Zn^{2+}$) is supported by four $OH^-$ ions to create the complex anion $Zn(OH)_4^{2-}$. The concentration of $OH^-$ ions in the electrolyte solution is maintained by the oxidizer reduction reaction at the cathode and the release of the $OH^-$ ions from reaction of the $Zn(OH)_4^{2-}$ anion. The electrolyte flow transports the relatively unstable $Zn(OH)_4^{2-}$ ion away from the anode, thus preventing the zinc ion from reducing back to zinc at the anode 14 (which in turn improves efficiency, as electrons are free to flow through the load L rather being consumed by reduction of the zincate ion). And, in the electrolyte, the complex $Zn(OH)_4^{2-}$ anion reacts in the solution to provide water ($H_2O$), $OH^-$ ions, and zinc oxide (ZnO), which is present in the electrolyte. The zinc oxide (ZnO) is formed by the removal of two of the $OH^-$ ions from the zincate anion ($Zn(OH)_4^{2-}$), the remaining two $OH^-$ ions react to form one water molecule ($H_2O$) and the ZnO product.

Thus, the overall reaction between the reduced oxidizer ($OH^-$) ions and the oxidized zinc ($Zn^{2+}$) ions provides the intermediary by-product of $Zn(OH)_4^{2-}$, which ultimately reacts to become zinc oxide (ZnO). As can be seen from the representative reaction equations set forth above, the remaining constituents of the reactions balance out (i.e., they are consumed or created in equal amounts). Thus, in its simplest form of expression, the overall reaction at the anode reduces the oxidizer at the cathode 12 with electrons received from the load, oxidizes the fuel particles at the anode to supply electrons to the load, and reacts the reduced oxidizer ion and oxidized fuel ions to form a by-product, in this case zinc oxide. The transport flow in the direction from the anode towards the cathode helps support and drive this process and increases the overall power output.

Additional intermediary reactions may occur at the anode and/or the cathode and/or in the gap, and the described reactions are not intended to be exclusive of any side or intermediary reaction. Also, the reactions are representative and may be expressed differently, but the general overall reaction results in the oxidation of zinc and reduction of oxygen to produce the by-product of zinc oxide (ZnO) and electrical current that drives the load L. The zinc oxide by-product may flow out of the electrochemical cell with the electrolyte. As an option, the zinc oxide may be recovered from the flow and the zinc may be separated and reintroduced into the fuel and electrolyte source. Likewise, the zinc oxide may remain in the electrolyte which is recirculated through the cell, and be re-reduced on the anode 14 later during charging.

Although the directional flow in the anode-cathode direction helps increase the power output, in certain situations or applications, it may be desirable to cease the flow. Even when the flow is stopped, some power may be generated, although the power output would be significantly less than when the electrolyte is flowing and transporting the oxidized fuel ions away from the anode 14 and towards the cathode 12. This "passive operation" state with no or essentially no flow may be useful for powering devices with a standby mode (e.g., a laptop computer) or some other mode where only a small amount of power is required. An optional suitable controller may be used to control whatever flow generator is provided for generating the flow to switch between this passive state and an active state where the transport flow is present.

In designing the various parts, the structures and various channels can be manufactured on the microfluidic scale to achieve a small, compact size, which is best suited to portability. Various techniques from the formation of microelectronics may be used, such as lithography, thin film deposition, electrochemical processing, and microfluidic processing methodologies may be used. These techniques may be used to enable large scale manufacturing of electrochemical cells designed in accordance with the present invention.

The electrolyte and the resulting product of the fuel/oxidizer reaction (e.g., zinc oxide) exits the electrochemical cell 10 through the anode holder 26 via the channels 66 of the anode holder 26.

Preferably, but not necessarily, an electrochemical cell constructed in accordance with this invention, including any embodiment described above or below, may be used in portable applications, such as for powering laptops, cell phones, portable audio players, wireless e-mail devices, medical equipment, or any other device for which portability by a person is desirable. However, it should be understood that the present invention may be practiced on larger scale, non-portable devices, and the advantage of portability is not intended to be limiting. To the contrary, the present invention is not limited to portability, but it is believed to be particularly useful for achieving portability. The cell may be configured as a metal-air battery. It may also be used in automotive applications or as a back-up power supply.

As can be seen from this disclosure, the electrochemical cell of the present invention provides a number of non-limiting advantages, including but not limited to:

most metals are stable and non-volatile, thus rendering their use in portable items relatively safe (as opposed to fuel cells that use a combustible fuel);

the flow in the anode to cathode direction may optionally be used to increase the overall power output;

the flow rate may optionally be regulated to adjust the power output;

the flow may optionally be stopped to allow the system to operate in a low power output passive state;

the presence of one or more return channels adjacent to the anode space/cavity may optionally allow for each individual electrochemical cell to have its own transport and return flow paths without interfering with the operation of an adjacent electrochemical cell, thus providing for a wide range of freedom in constructing multiple electrochemical cell arrays; and the optional return channel configuration also provides for a compact design.

An electrochemical cell designed in accordance with any aspect of the present invention need not have all these advantages, and various aspects of the invention may achieve one, some, or all of these advantages depending on the specific embodiment implemented. For example, it is not necessary for each individual electrochemical cell to have its own transport and return flow paths without interference with the operation of an adjacent electrochemical cell for the cells to operate. In an embodiment, adjacent electrochemical cells may be configured to operate in series such that the electrolyte may flow between cells. The illustrated embodiment is not intended to be limiting in any way.

In the preferred embodiments of the invention, the fuel (metal or otherwise) may be collected at the anode by electrodeposition. In such an approach, the anode body's potential is changed so that it acts as a cathode for the reduction of the fuel ions, thus causing fuel cations in the electrolyte to be electrodeposited on the body. Thus, the anode body may be broadly characterized as being a permeable body, which includes any body on which the fuel can collect (either by filtering, electrodeposition, or otherwise) and through which the electrolyte can flow.

The foregoing description of a metal fueled cell is for reference only and is not intended to be limiting. The present invention, and particularly the electrodeposition technique described below, may be used in a variety of different cell arrangements, including, for example, a cell in which the flow is in a direction parallel to the anode and cathode, a cell in which there is no flow at all, a set for cells connected in electrical and/or fluid series, etc. The following description of an electrodeposition technique using multiple bodies for the anode may be used in the above-identified or any other type of cell.

This electrodeposition approach may be used advantageously in certain embodiments where the reaction between the oxidized fuel ions and the reduced oxidizer ions to form the by-product is reversible. For example, in the embodiment discussed above using zinc as the fuel, the zinc oxide by-product may be allowed to accumulate and remain in the electrolyte as a suspension or colloid during operation (or under some conditions the by-product may remain as zincate ions in the electrolyte). Then, to re-charge the anode body with zinc fuel, a cathodic potential can be applied to the anode body (which is now acting as a cathode), to cause the zinc cations from the zinc oxide to deposit on the anode body. An additional electrode that acts as an anode when the cathodic potential is applied to the anode body may also be used. With the ability to discharge and re-charge, the cell may be used as a re-chargeable battery power supply or a re-chargeable back-up power supply.

In other aspects of the invention, the general cell architecture and arrangement of the counterflow between the portion of the flow leaving the anode 14 and the portion of the flow returning to the return channels may be used with non-particulate fuels and a more traditional fixed catalytic anode. For example, reference may be made to U.S. patent application Ser. No. 11/962,803, filed Dec. 21, 2007, for teachings of suitable anode, cathode, electrolyte, fuel, and oxidizer materials in this regard. The general flow arrangement may also be advantageously used with other types of electrochemical cells as well to enable systems comprising a number of orthogonal flow type cells to be arranged in parallel. Thus, the electrode through which the electrolyte flows may be generally referred to as a first electrode (which will typically be an anode), and the electrode on the opposite of the gap may be generally referred to as a second electrode (which will typically be a cathode, and preferably a breathing cathode). And likewise, the corresponding reactant that is oxidized or reduced at the first electrode may be referred to as the first reactant (which will typically be the fuel), and the corresponding reactant that is oxidized or reduced at the second electrode may be referred to as the second reactant (which will typically be the oxidizer). However, because the components may be reversed, the terms first and second may be used in a more generic sense to cover either alternative.

FIGS. 14-18 relate more specifically to the electrodeposition of metal fuel on the first electrode (i.e., the electrode that functions as the anode during current generating operation of the cell). The electrodeposition methodology aspect of this disclosure may be used in any type of electrochemical cell, and is not limited to the type of cell described above where the electrolyte flow supports the power generation of the cell. Thus, although the methodology is described with reference to Figures depicting such a cell, this is not intended to be limiting. However, the electrodeposition methodology described has particular advantages in such a cell, as discussed below. Where the same reference numbers are used between FIGS. 14-18 and the prior Figures, it should be understood that similar structures are being referred to, and it is not necessary to repeat the description of those structures herein with reference to FIGS. 14-18.

Figure 14:
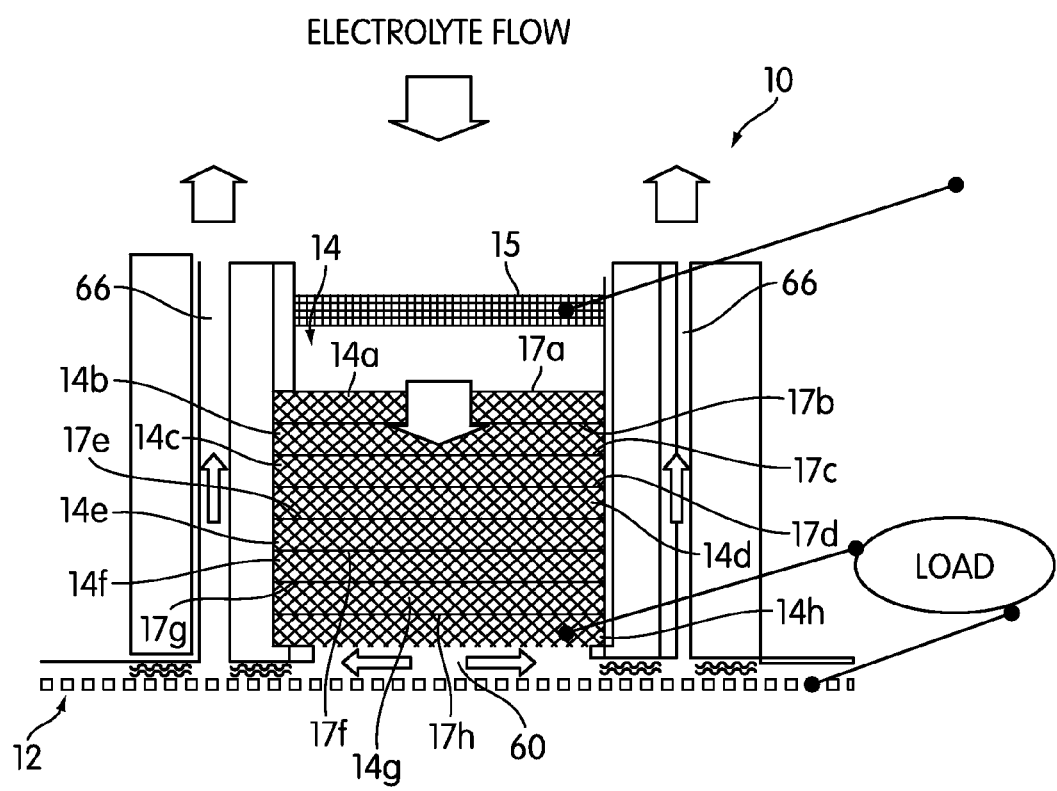
FIG. 14 is a schematic view of an electrochemical cell with a stack of permeable electrode bodies for recharging during its current generating operation.
Figure 15:
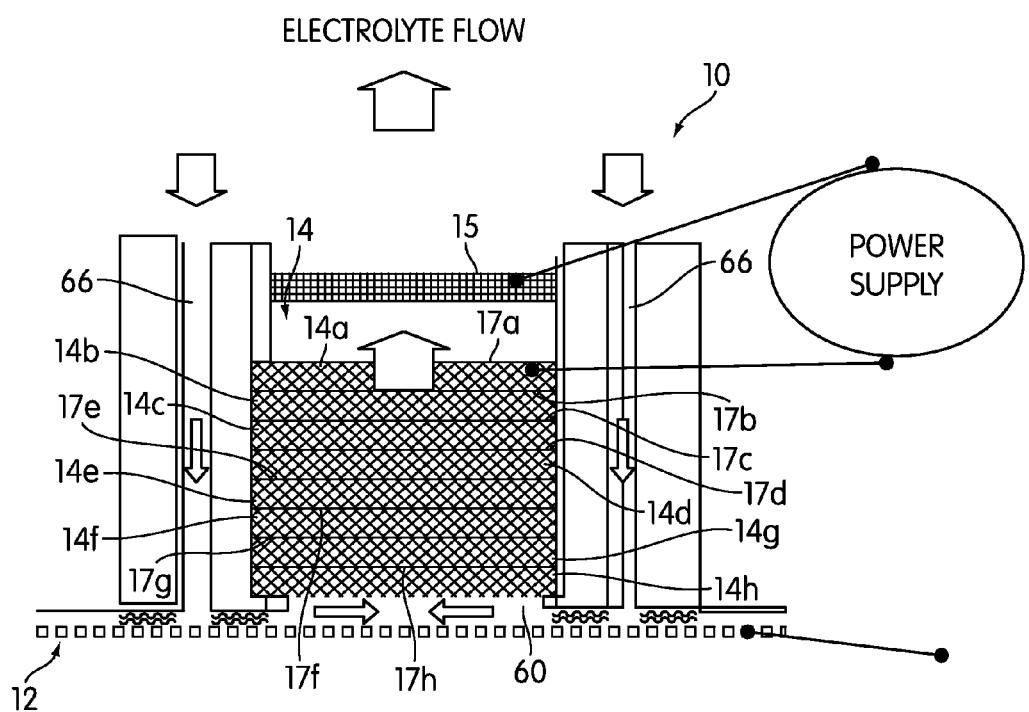
FIG. 15 is a schematic view of the cell of FIG. 14 during its charging operation.
Figure 16:
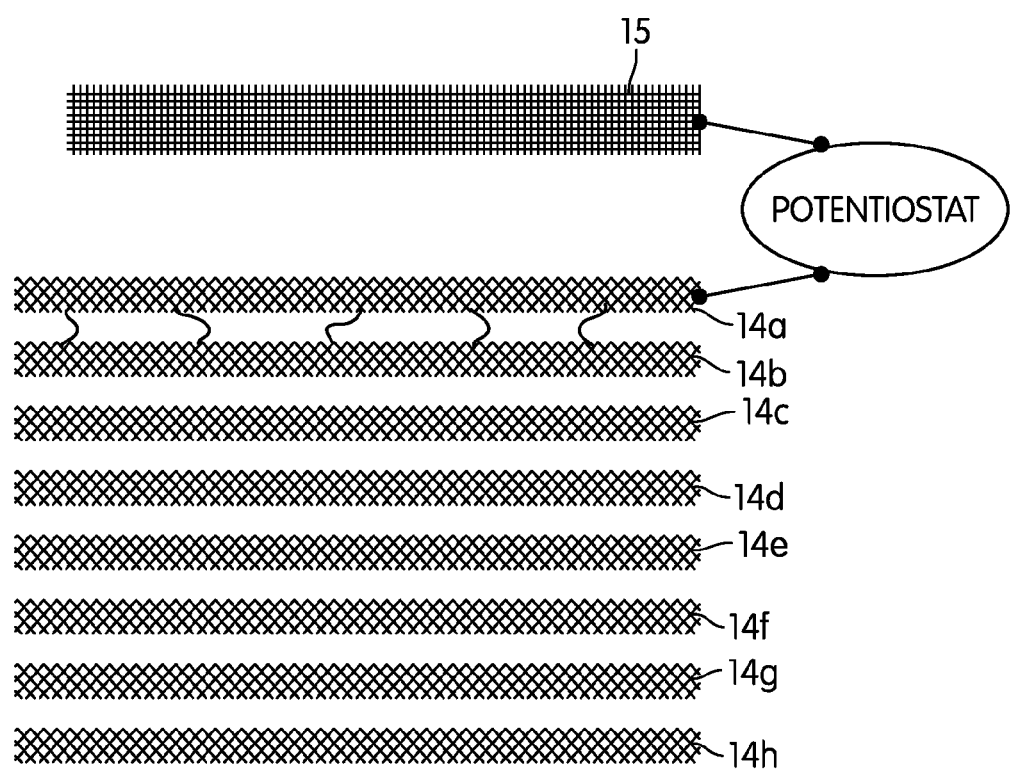
FIG. 16 is an isolated schematic view of the electrode bodies and the electrodeposited fuel growth thereon.
Figure 17:
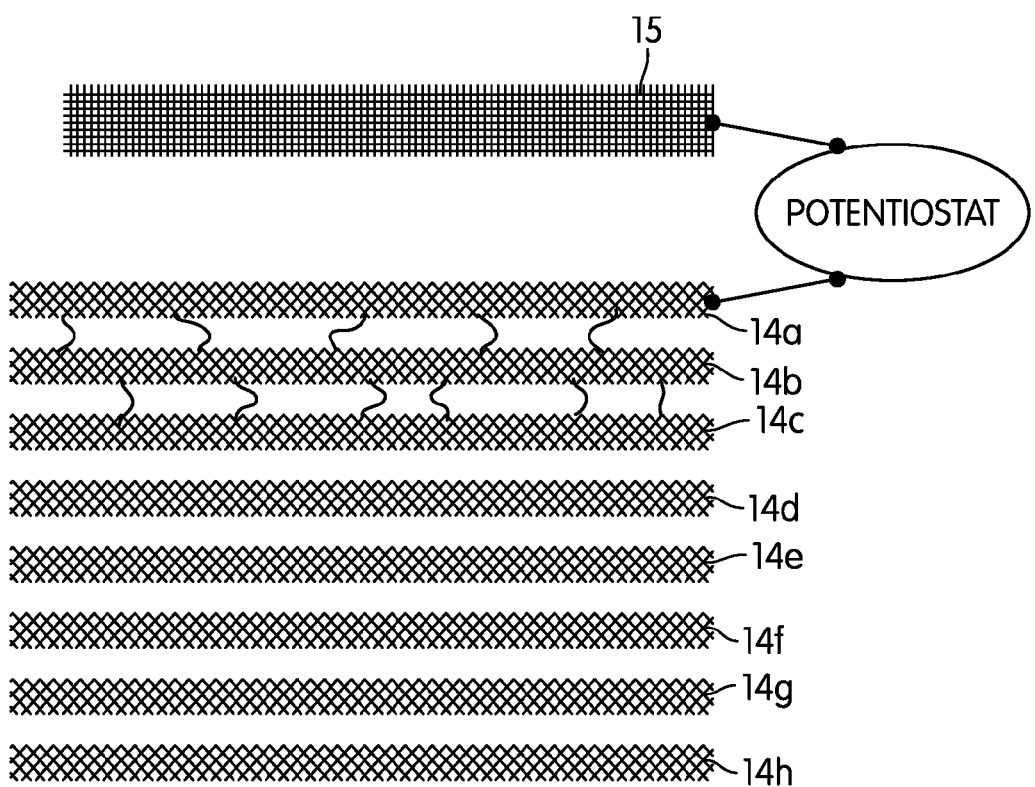
FIG. 17 shows the progression of the growth in FIG. 16.
Figure 18:
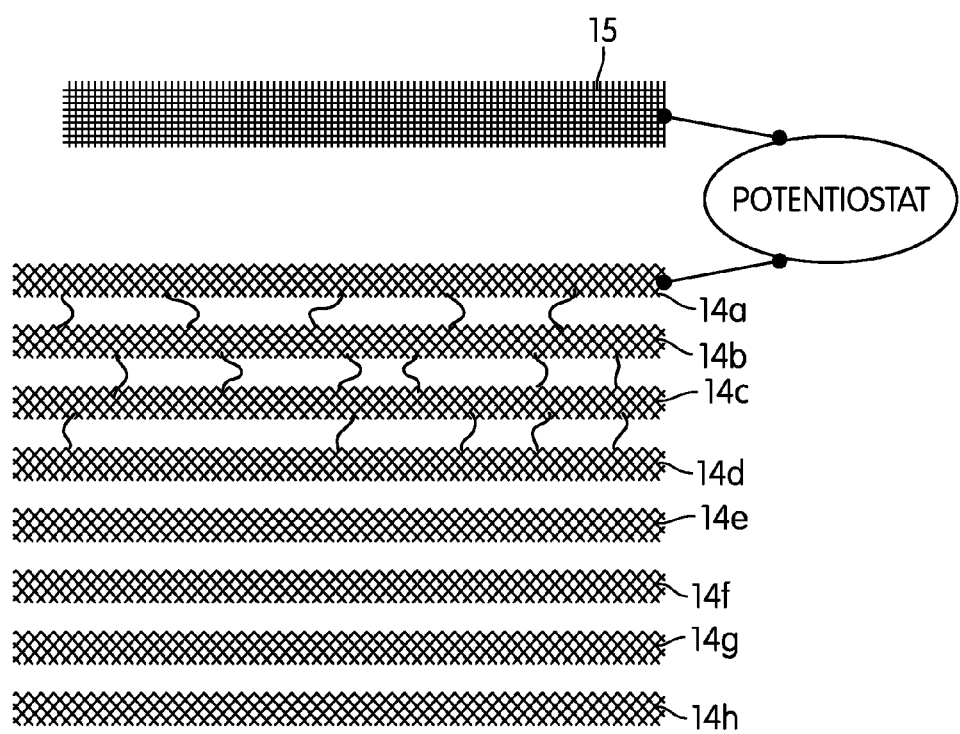
FIG. 18 shows the continued progression of the growth in FIGS. 16 and 17.

FIGS. 14 and 15 show the cell 10 schematically and in somewhat exaggerated dimensions so the various workings can be better appreciated. Likewise, FIGS. 16-18 show exaggerated views of an electrode being charged with metal fuel isolated from other parts of the cell 10 so that the growth of the metal fuel electrodeposition can be seen more easily. This is not intended to be limiting, and is merely for illustrational purposes. As can be seen in the Figures, the cell 10 comprises a first electrode 14 comprising a series of permeable electrode bodies 14*a-h* arranged in spaced apart relation along a flow path (although eight bodies are shown, any number may be used). The first electrode 14 functions as an anode during current generation. The cell 10 also comprises a second electrode 12, which functions as the cathode during current generation. As was the case with the prior embodiment, the second electrode 12 may be an air breathing cathode that reduces oxygen absorbed from ambient air. However, it may be any other type of electrode that functions as a cathode during current generation, and the invention is not necessarily limited to an air breathing electrode. The second electrode 12 is spaced apart from the first electrode 14, preferably by a gap 60 similarly to the embodiment as discussed above.

The cell 10 also includes a charging electrode spaced apart from the first electrode 14. In the illustrated embodiment, the charging electrode is a third electrode 15 spaced apart from the first electrode 14 on the side opposite the second electrode 12. In some embodiments, the third electrode 15 may be spaced apart from the first electrode 14 on the same side as the second electrode 12, such as by being in the gap 60. However, in some embodiments, the second electrode 12 may be used during charging as the charging electrode, and the presence of a separate electrode dedicated to charging is not necessary. In the illustrated embodiment, a separate charging electrode 15 is used because most electrodes suitable for function as an air breathing cathode do not perform well in the anodic role of a charging electrode. However, the invention is not intended to be limiting, and it is possible to select a second electrode that is bi-functional, meaning that it can perform both the role of an air breathing cathode during current generation and the role of an anodic charging electrode during charging. Thus, any reference herein to a charging electrode may be regarded as applying either to the second electrode 12 or a separate electrode 15 functioning as the anode during charging. More specifically, while the illustrated embodiment is described with reference to the charging electrode as a third electrode 15, it should be understood that the same description could be used where the second electrode 12 is the charging electrode; and it should be readily understood that the flow (if used) may be oriented accordingly.

As can be seen in FIGS. 14 and 15, as an option the permeable bodies 14*a-h* may be separated by inert, non-conductive separators 17*a-h*. These separators 17*a-h* are designed to maintain separation and electrical isolation between the permeable electrode bodies 14*a-h*. These separators would typically be provided about the periphery of the electrode bodies 14*a-h*, so that they are exposed to one another within the open interior of the separators. As an option, the separators 17*a-h* may also include structures in this interior region to help maintain the separation of the permeable electrode bodies 14*a-h* without significantly impeding flow of electrolyte therethrough. As an another non-limiting option, the separators may also include structures, such as a latticed arrangement, in this interior region to assist and direct the growth morphology of the metal fuel deposition, which is described further below. However, the use of separators is optional, and other ways of maintaining separation of the permeable electrode bodies 14*a-h* may be used, such as rigid mounting points to the surrounding structure that maintains the separation.

Similarly to the prior embodiment, the cell further comprises one or more return channels 66 communicated to the gap 60. But this is not necessary. In particular, in flow-based cells where the flow is parallel to the anode and cathode, the flow may simply enter one side and exit the other via ports, and there is no need for the particularly designed return channels as illustrated.

Charging the electrochemical cell is performed by flowing the electrolyte comprising reducible metal fuel ions along the flow path through the permeable electrode bodies 14*a-h*. The reducible fuel ions may be present in the electrolyte in any suitable form, such as in ionic, atomic, molecular or complexed form. As can be seen in FIG. 15, in one possible embodiment, during charging the electrolyte flow is reversed from the current generating direction shown in FIG. 14, as described above with regard to the prior embodiment. As a result, the flow runs in a direction from the first electrode 14 towards the charging electrode 15. As will be discussed below, this is an optional approach with its own benefits, and it is within the scope of the invention to keep the flow in the same direction as during current generation (which may, for example, be the case where the second electrode 12 is used as the charging electrode, or where the charging electrode is a separate electrode on the same side as the second electrode 12, such as in the gap 60). In other embodiments, such as where the flow is parallel to the first and second electrodes 12, 14, the flow direction is immaterial; and in other embodiments there may be no flow at all.

While the electrolyte comprising reducible metal ions is flowing through the permeable electrode bodies, an electrical current from an external source, such as a potentiostat or any other source capable of delivering electrical current, is applied between the charging electrode 15 and a terminal one 14*a* of the permeable electrode bodies 14*a-h* with the charging electrode functioning as an anode and the terminal permeable electrode body 14*a* functioning as a cathode. As a result, the reducible metal fuel ions are reduced and electrodeposited as metal fuel in oxidizable form on the terminal permeable electrode body 14*a*. In the illustrated embodiment, the terminal permeable electrode body 14*a* is the electrode body proximate the charging electrode 15. While this is preferred in the context of the illustrated embodiment, in other arrangements a different one of the permeable electrode bodies 14*a-h* may serve as the terminal permeable electrode body, as discussed below.

In one non-limiting embodiment, the fuel is zinc and the electrolyte is potassium hydroxide (KOH), which is the same fuel and electrolyte used in the above-described embodiment. In the electrolyte, the zinc ions may be provided in any suitable reducible form, and preferably in the form of zinc oxide (ZnO). This is advantageous, as zinc oxide is the by-product of the current generating operation described above with regard to the prior embodiment, and thus the cell can be re-charged using the reversible by-product of its own current generating operation. This eliminates the need to supply the fuel from a fresh source for each charging, as the current generating operation has already created the reducible zinc oxide in the electrolyte. In such an embodiment, the reduction reaction occurs as follows at the reduction site:

$$ZnO+H_2O+2e^- \rightarrow Zn+2OH^- \quad (4)$$

And the corresponding oxidation occurs at the charging electrode 15 functioning as an anode (also referred to as an oxygen evolving electrode) as follows, oxidizing the oxygen species to produce oxygen gas that may optionally be off-gassed in any suitable manner:

$$2OH^- \rightarrow 2e^- + \tfrac{1}{2}O_2 + H_2O \quad (5)$$

However, the fuel need not be limited to zinc, and any other metal fuel, including any of those mentioned above in this application, may also be used. Likewise, the electrolyte may be different, and may be alkaline or acidic in various embodiments. Also, it is not necessary that the reducible fuel ions be provided by the by-product of the current generating operation, and it is within the scope of the invention to use fuels that create by-products that are not readily reversible. Thus, it is within the scope of the invention that the electrolyte used for charging be supplied from a separate fuel source with the fuel ions in a suitable form for reduction and electrodeposition, which fuel source is separate from the electrolyte used during current generation and which accumulates the by-product. Likewise, the same electrolyte could be used in both processes, but the fuel could be provided separately from its own source during re-charging.

During the charging, the electrodeposition causes growth of the metal fuel in a flow permeable morphology among the permeable electrode bodies 14a-14h such that the electrodeposited metal fuel establishes an electrical connection between the terminal permeable body 14a and each subsequent permeable electrode body 14b-h. As a result of this growth, the reduction and the electrodeposition occur on each subsequent permeable electrode body 14b-h upon the establishment of the electrical connection.

By flow permeable morphology, this terms means that the morphology of the metal growth among the electrode bodies 14a-h is configured such that the electrolyte is still able to flow through the electrode bodies 14a-h. Thus, the flow is allowed to continue, and the growth does not exhibit dominant lateral characteristics that would cause complete clogging or blocking of the pores or openings of the permeable electrode bodies 14a-h. The growth may have any such configuration. The flow permitted may be in any direction. It is also possible to have the growth occur without any flow, although flow is preferred.

For example, the growth may occur as a dense branch morphology or it may be dendritic. With these morphologies, the growth will have sufficient directionality towards the next permeable electrode body, thus providing for the establishment of connections between the adjacent electrode bodies 14a-h while still allowing for the flow to continue passing therethrough. Also, the growth may occur as a generally uniform plating growth. With a generally uniform plating growth, it is preferable that the distance between the permeable electrode bodies 14a-h be less than that of the pores or openings in the bodies, such that the growth in the direction between the adjacent bodies 14a-h establishes contact between the adjacent bodies before lateral growth closes the pores or openings. However, it is also possible for the flow to provide some directionality to the plating growth so that this spacing is not a critical factor.

In the illustrated embodiment, the growth exhibited is dendritic, and the growth is in the direction opposite the charging electrode 15 (i.e., which is also the direction opposite the flow). FIGS. 16-18 illustrate the growth morphology in an exaggerated format to better understand the basic principles of operation. In a practical execution, the growth will typically be significantly denser throughout the stack of electrode bodies 14a-h.

In FIG. 16, the initial reduction of the fuel ions and electrodeposition of the metal fuel is shown. The dendrites are initially electrodeposited on and begin their growth on the terminal electrode body 14a. This is because electrode body 14a is connected to the external current, and has a cathodic potential that causes the reduction of the fuel ions and electrodeposition of the fuel thereon (while the charging electrode 15 is connected the external load and functions as the anode). In contrast, the remaining electrode bodies 14b-h are initially inactive and do not function as a reduction site because they are not connected to the external current. The growth continues with the metal growing as a series of dendrites from electrode body 14a towards electrode body 14b. This then establishes an electrical connection between electrode bodies 14a and 14b, which in turn causes electrode body 14b to now also have the cathodic potential applied to it.

The growth thereafter continues with the fuel ions being reduced and electrodeposited as metal fuel on electrode body 14b, as shown in FIG. 17. This growth continues with the metal growing as another series of dendrites from electrode body 14b towards electrode body 14c. This then establishes an electrical connection between electrode bodies 14a, 14b and 14c, which in turn causes electrode body 14c to now also have the cathodic potential applied to it.

The growth thereafter continues with the fuel ions being reduced and electrodeposited as metal fuel on electrode body 14c, as shown in FIG. 18. This growth continues with the metal growing as another series of dendrites from electrode body 14c towards electrode body 14d. This then establishes an electrical connection between electrode bodies 14a, 14b, 14c, and 14d which in turn causes electrode body 14d to now also have the cathodic potential applied to it. This growth pattern will continue throughout the entire stack of permeable electrode bodies 14a-h in the first electrode 14. Eventually, the growth on the last body 14h may reach to the charging electrode, thus shorting the circuit and indicating completion of the growth.

Generally, at any given time, the majority of the metal fuel growth will be associated with the last (i.e., most recent) electrode body to which the cathodic potential has been applied. That is, in the illustrated embodiment where the electrolyte is flowing orthogonally through the electrode bodies 14a-14h, it will be associated with the cathodic electrode body that is the furthest upstream with respect to the electrolyte flow. It is believed that this occurs because the concentration of fuel ions is greater upstream, and thus many of the fuel ions will be reduced from the electrolyte at the first cathodic electrode encountered, which in turn makes fewer ions available for reduction and deposition on the subsequent electrode bodies downstream (i.e., towards the terminal electrode body 14a). Thus, in FIG. 18, once an electrical connection has been established with electrode body 14d causing it to have a cathodic potential, the majority of reduction will occur on electrode body 14d and any dendrites or other growth formations emanating from it in the upstream direction. Likewise, some reduction and electrodeposition may be associated with electrode body 14c and its growth formations, but this will be to a lesser extent because the concentration of available ions will be less. And likewise progressively lesser reduction and electrodeposition will be associated with electrode bodies 14a and 14b and their growth formations, with body 14a experiencing the least. This progressively decreasing growth gradient is beneficial, as it allows the largest amount of reduction and electrodeposition to occur at the freshest reduction site, but allows some continued electrodeposition to occur downstream at the prior reduction sites to increase their density (but preferably not so much that the flow therethrough is impeded). This progressive density of the growth should not be regarded as limiting.

In the illustrated embodiment, the growth pattern is relatively atypical and worth noting. Generally, when re-charging an electrochemical cell, dendritic or other growth morphologies tend to grow from the cathode (i.e., the permeable electrode bodies) towards the anode (i.e., the charging electrode 15). This is often regarded as undesirable in the art, and many electrochemical cells use various means to suppress or avoid such growth, such as the use of dendrite inhibitors in the electrolyte. However, in the illustrated embodiment, the flow rate, fuel ion concentration, and the external current (and more particularly the potentials it applies to the permeable electrode bodies 14a-h and the charging electrode 15) may be controlled such that the growth is permitted but its direction is reversed. Without being limited to any specific scientific theory, it is believed that the use of a flow towards the charging electrode 15 enables diffusion limited aggregation to dominate the general tendency for the growth to occur towards the charging electrode 15 (i.e., the anode during charging). With diffusion limited aggregation, the tendency is for the electrodeposition growth to occur in the direction of the concentration gradient of the reducible fuel ions. In the illustrated embodiment, because those ions are being reduced as the electrolyte flows over the reduction sites established by the cathodic potential at the respective electrode bodies 14a-h, the concentration of ions in the electrolyte on the upstream side (i.e., away from the charging electrode) is greater than on the downstream side (i.e., towards the charging electrode). Thus, by maintaining an appropriate flow rate and concentration in relation to the potential difference, the differential in concentration upstream and downstream of the reduction sites can be manipulated to establish the growth of the electrodeposited metal in the direction away from the charging electrode 15, thus dominating over the general tendency for the growth to occur in the direction towards the charging electrode 15.

The parameters governing this particular growth pattern may vary as they are interrelated. For example, a higher flow rate will typically provide less of a fuel ion differential at any given reduction site, as in essence the electrolyte volume is exposed to the reduction potential for less time. This may contribute to growth in the direction towards the charging electrode, whereas a lower flow rate will contribute to growth away from the charging electrode. Likewise, a higher potential difference between the charging electrode and the electrode bodies may also tend to contribute to growth in the direction towards the charging electrode; whereas a lower potential difference may do the converse. Further, a higher fuel ion concentration may result in less of a gradient between the upstream and downstream sides of any given reduction site, also contributing to growth in the direction towards the charging electrode; whereas a lower concentration may do the converse. Moreover, other factors, such as temperature, or the pH or other characteristics of the electrolyte, may contribute to the directionality of the growth. Because all these factors are in competition and no single one of them overwhelmingly dictates the final growth pattern, they may be varied and adjusted with respect to one another to achieve the desired growth in the direction away from the charging electrode so that the stack of electrode bodies can be charged with the electrodeposited fuel.

An advantage of achieving growth in this manner is that the competition between growth directions may allow the growth to occur more slowly among the electrode bodies 14a-h so that it occurs more densely as the growth proceeds among them.

It is also within the scope of the invention to alter the arrangement and have the electrode body 14h distal from the charging electrode 15 be the terminal electrode body. In such an arrangement, the desired growth direction would be towards the charging electrode 15, rather than away from it. In such a situation, it is possible to reverse the flow so that it flows away from the charging electrode 15 (i.e., in the normal current generating direction of the illustrated embodiment running from electrode body 14a to electrode body 14h). In this arrangement, the growth of the fuel towards the charging electrode 15 would be overwhelmingly dominant, both because of the natural tendency for metal to grow towards the charging electrode 15 due to its anodic potential, and because the concentration of fuel ions would be greater on the upstream side towards the charging electrode 15. While this is possible and is within the broad scope of the invention, the growth may occur very rapidly because there is little or no competition in the opposite direction, and the resulting growth morphology may be less dense. More specifically, because the growth will occur more rapidly, the connections between the electrode bodies will be established more rapidly, and thus the growth between each set of electrode bodies will tend to be less dense. This may be desirable in certain embodiments.

As mentioned above, it is also possible to have the charging electrode be either the second electrode 12, or a separate third electrode on the same side as the second electrode, such as in the gap 60. In this case, the electrode body 14a may be used as the terminal electrode body for charging purposes, and the flow may run in the direction from the first electrode 14 towards the charging electrode (i.e., from electrode body 14a to electrode body 14h within the first electrode 14). In such an approach, it would be preferable for the potential difference to be the dominant factor in the directionality of the electrodeposition, such that the flow permeable growth grows from the terminal electrode body 14a towards electrode body 14h. Some competition from the tendency for growth to occur in the direction of the concentration gradient (i.e., upstream) in such an arrangement may beneficially enhance the growth density. Alternatively, the flow may be reversed to run through the first electrode away from the charging electrode (i.e., from electrode body 14h to electrode body 14a within the first electrode 14) so that both the potential and the concentration gradient contribute to directionality of the growth in that direction.

Likewise, where the charging electrode is either the second electrode 12 or a separate electrode on the same side as the second electrode 12, the electrode body 14h may be used as the terminal electrode body for charging purposes, and the flow may run in the direction from the first electrode 14 towards the charging electrode (i.e., from electrode body 14a to electrode body 14h within the first electrode 14, which is the same as the normal current generating direction). In this approach, the dominant factor in the directionality of the electrodeposition may be concentration gradient, such that the flow permeable growth is from terminal body 14h toward electrode body 14a (i.e., away from the charging electrode). This is similar in growth pattern to the embodiment illustrated in FIGS. 14-18, albeit the location of the charging electrode and the flow direction are reversed. The density achieved by competition between the potential driven tendency to grow towards the charging electrode and the concentration driven tendency to grow upstream in the flow would be present here.

In other embodiments, it is possible to provide for bi-directional charging of the first electrode 14. For example, at one or more times during the charging, the electrolyte flowing in the direction from the first electrode 14 towards the charging electrode 15 may be reversed to flow in the opposite direction (i.e., from the charging electrode 15 towards the first electrode 14). As a result, both types of growth may be achieved, thus providing bi-directional growth of the metal fuel both towards and away from the charging electrode 15. Such an approach may be used with the terminal electrode body being any one of the electrode bodies 14a-h, including any one of the intermediate electrode bodies. Thus, the broadest aspects of the invention are not intended to be limited to uni-directional growth.

As mentioned before, it is possible to practice this multiple electrode body deposition technique in a cell with flow that is parallel to the electrodes rather than orthogonally through them, or in a cell with no flow at all. In such embodiments, it would be preferable for the terminal electrode body to be the one distal from the charging electrode (i.e., the electrode functioning as the anode during re-charging) so that the growth towards the charging electrode progresses through the multiple electrode bodies 14a-14h by its natural tendency to grow towards the anodic potential.

To complete the charging, the electrical current is then removed to discontinue the charging.

Once the charging is completed, the cell may be used to generate electrical current. The cell may be operated in any manner, including as described above with respect to the prior embodiment. The metal fuel is oxidized on the permeable electrode bodies 14a-h of the first electrode 14 functioning as an anode, and an oxidizer is reduced at the second electrode 12 functioning as a cathode. As a result, electrons are generated for conduction from the first electrode to the second electrode via a load, and the oxidized fuel ions and reduced oxidizer ions react to form a by-product in the electrolyte. Preferably, as described above with regard to the prior embodiment, the electrolyte flows along the flow path in a direction from the first electrode 14 towards the second electrode 12 (a) through the permeable electrode bodies 14a-h of the first electrode 14 and towards the second electrode 12 across the gap 60 to transport at least the electrolyte and the oxidized fuel ions away from the first electrode 14 and towards the second electrode 12, and (b) then through the one or more return channels 66 to transport at least the electrolyte and the by-product formed by the reaction of the oxidized fuel ions and the reduced oxidizer ions away from the gap 60. While it is preferred that the current generation occur with the electrolyte flowing through the flow path as described with regard to the prior embodiment, it is within the scope of the invention to use the charging method described above with any type of electrochemical cell, including one with parallel flow or one that does not rely on flow to assist in the current generation.

In the illustrated embodiment of FIGS. 14-18, as an option the permeable electrode body 14h proximate to the second electrode 12 may be used as the terminal electrode body for purposes of connecting to the load to which current is delivered (irrespective of whether it was the terminal electrode body for purposes of charging). While as a practical matter oxidation may occur throughout the stack of electrode bodies 14a-h, the consumption progresses through the electrode stack in the direction towards the second electrode 12. Specifically, the consumption progresses from the electrode body 14a distal to the second electrode progressively through to the proximate electrode body 14h. It is believed that this occurs because oxidized fuel ions are generated in the stack upstream of the proximate electrode body 14h, but because they continue to be exposed to the anodic electrode bodies and their growth formations, which are functioning as oxidation sites, they tend to re-reduce. This provides a "cascading" effect, with the fuel at the upstream anodic sites oxidizing and re-reducing progressively through the stack, which in turn causes the fuel to be progressively consumed in the direction of the second electrode. Ultimately, as an overall net result of the oxidation occurring throughout the stack, oxidized fuel ions enter the gap and travel away from the proximate electrode body 14h, thus enabling the remaining fuel cell reaction to occur in the gap as described above. Thus, the overall net reaction will provide for a continuous generation of electrons based on the transport of oxidized fuel ions away from the proximate electrode body 14h. This action is enhanced by the use of the transport flow described above, which actively transports the oxidized fuel ions away from the electrode body 14h. As such, the progression of fuel consumption begins (with respect to the non-limiting illustrated embodiment) at electrode body 14a and its associated growth formation, and then works through the electrode stack with each electrode body becoming disconnected and inactive until the fuel at electrode body 14h is finally consumed. This is not intended to be limiting, and other arrangements for enabling consumption of the fuel may be provided, and the flow may be in any direction or not used at all.

Figure 19:
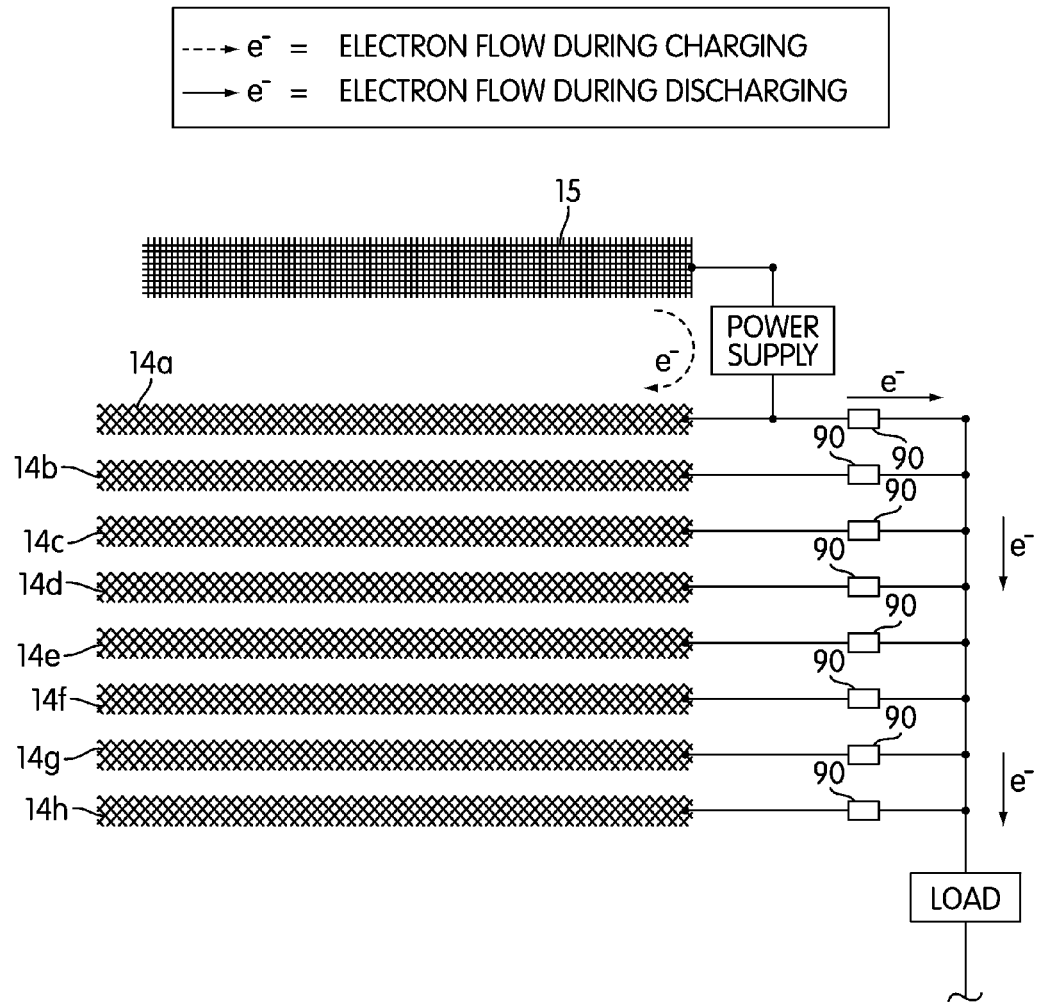
FIG. 19 is a schematic view similar to FIG. 16, but showing an alternative embodiment.
Figure 20:
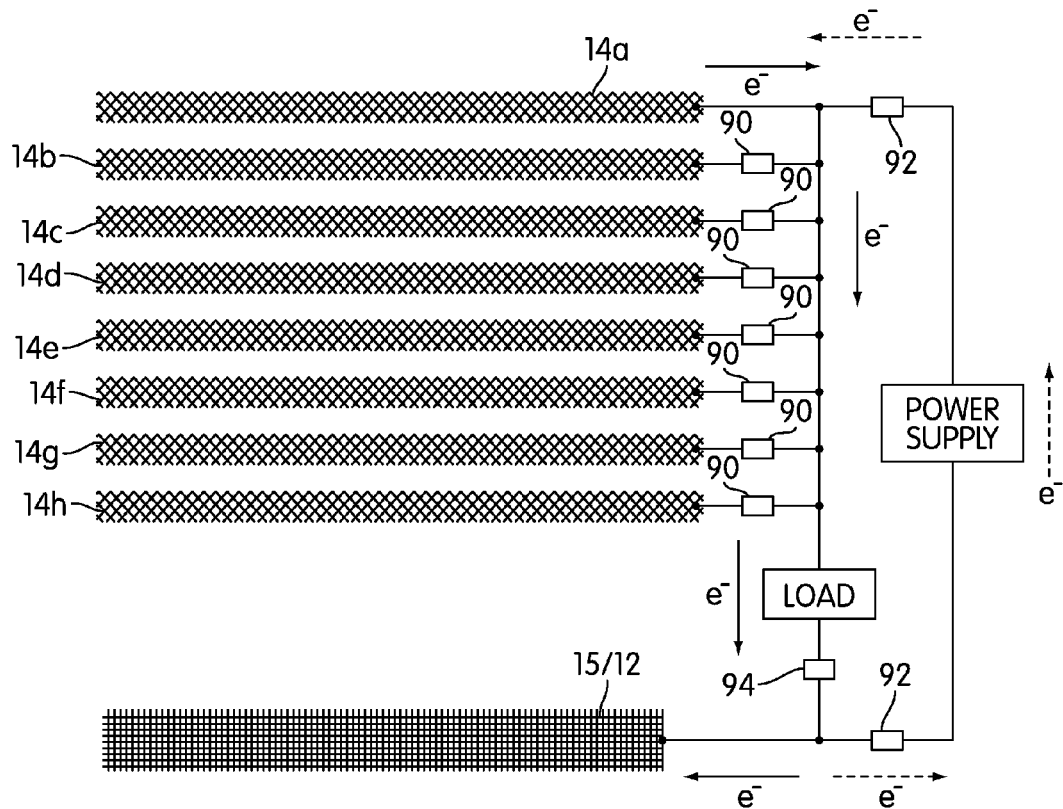
FIG. 20 shows a schematic view similar to FIG. 16, but showing yet another alternative embodiment.

FIGS. 19 and 20 show alternative embodiments where each of the bodies 14a-14h in the stack is coupled to the load. Using such an approach is desirable, as during power generation (i.e., discharge), oxidization may be occurring throughout the stack, thus liberating electrons for conduction to the load. By connecting terminals for current collection purposes to all the electrode bodies 14a-14h, these electrons can be collected directly from each electrode body. Moreover, this arrangement is desirable because it still allows for current collection from oxidation reactions on-going at electrode bodies that have become "disconnected" from the other electrode bodies by consumption of the growth between the bodies. Such a condition may occur during power generation or discharge based on various factors. In some embodiments, this may be preferred over using a single terminal for purposes of connection to the load, as discussed above.

However, having all the electrode bodies connected together in parallel may not be desirable when attempting to create the progressive growth of fuel described above. Instead, it is desirable to have one (or a select few) electrodes connected to the external circuit during charging.

FIG. 19 shows an embodiment similar to FIG. 16, but with the load coupled in parallel to each of the electrode bodies 14a-14h of the first electrode 14, and also to the second electrode 12 (which in this case is not the same as the charging electrode 15 and is spaced apart by the gap as shown in FIGS. 14 and 15). Thus, during current generation, the fuel on the first electrode 14 is oxidized, generating electrons that are conducted to power the load and then conducted to the second electrode 12 for reduction of the oxidizer (as discussed in more detail above). FIG. 19 also schematically illustrates a power supply used for charging purposes coupled between the charging electrode 15 and the electrode body 14a. As discussed above in more detail, the power supply applies a potential difference between the terminal electrode body 14a and the charging electrode 15 such that the fuel is reduced and electrodeposited onto the terminal electrode body 14a and the corresponding oxidation reaction takes place at the charging electrode 15. To ensure that the growth occurs in a progressive manner through the stack from electrode body 14a in the direction towards electrode body 14h as discussed above, one or more current isolators 90 are provided to isolate the other electrode bodies 14b-14h from the circuit connected to the power supply.

The current isolators 90 prevent current from flowing among the electrode bodies 14a-14h, except as enabled by the progressive growth of the fuel during charging. The current isolators 90 also isolate the electrode bodies 14b-14h from direct connection with the power supply, such that the only connection is that established by the progressive growth. Stated differently, the isolators 90 prevent the potential of the power supply from being applied directly to those electrode bodies 14b-14h via the circuit during charging. As such, the only way for the electrical current/potential to be applied to those electrode bodies 14b-14h is via the electrodeposited growth within the stack as described above. The current isolators 90 may take any form, and no particular isolator should be regarded as limiting. For example, a current isolator 90 may be provided by one or more diodes that are oriented to allow electrons to flow from an electrode bodies 14a-14h to the circuit portion comprising the load, but prevent any current flow in the opposite direction. Likewise, a current isolator 90 may be a switch that is closed during power generation/discharge to connect an electrode body 14a-14h to the circuit portion comprising the load, and that is open during charging to disconnect and isolate the electrode body 14a-14h from that circuit. Any suitable control mechanism may be provided to control the action of the switch between the open and closed positions. For example, a relay switch that is biased toward the open position may be used, with an inductive coil coupled to the power supply that causes closure of the switch when charging begins. Further, a more complex switch that allows for individual connection to a plurality of the electrode bodies 14a-14h could be used to provide the connection/disconnection to and from the load, and to and from each other. Also, the current isolators may be different elements, such as a switch for current isolator 90 at electrode body 14a, and one-way diodes at the other electrode bodies 14b-14h. The flow of electrons is shown in dashed and solid arrows in FIG. 19 to illustrate the general functionality of the current isolator(s). Any other suitable electrical component that provides such isolation may be used.

Also, the configuration of FIG. 19 may be altered to work with any of the alternative embodiments described herein, or any other embodiments within the scope of the invention. For example, if another electrode body (e.g., body 14h) is used as the terminal electrode body during charging, then the power supply may be coupled to that electrode body and one or more current isolators may be used during charging to isolate the electrode body from the circuit comprising the load and the other electrode bodies.

FIG. 20 shows an embodiment where the second electrode 12 is also the charging electrode (hence, it has been labeled both 12 and 15 in the Figure). Thus, the second electrode 12 functions as the cathode during power generation/discharge, and as the anode during charging, as described above. In FIG. 20, the load is coupled in parallel to each of the electrode bodies 14a-14h of the first electrode 14, and also to the second electrode 12. Thus, during current generation, the fuel on the first electrode 14 is oxidized, generating electrons that are conducted to power the load and then conducted to the second electrode 12 for reduction of the oxidizer (as discussed in more detail above). FIG. 20 also schematically illustrates a power supply used for charging purposes coupled between the second electrode 12 and the terminal electrode body 14a. As discussed above in more detail, the power supply applies a potential difference between the terminal electrode body 14a and the second electrode 12 such that the fuel is reduced and electrodeposited onto the terminal electrode body 14a, and the corresponding oxidation reaction takes place at the second electrode 12 (functioning as the charging electrode). To ensure that the growth occurs in a progressive manner through the stack from electrode body 14a in the direction towards electrode body 14h as discussed above, one or more current isolators 90 are provided to isolate the other electrode bodies 14b-14h from the circuit connected to the power supply. Also, one or more, and in this case a pair, of optional second current isolators 92 are provided to isolate the power supply from the electrodes 12, 14 and 15 during power generation. An optional third current isolator is provided to isolate the second electrode 12 and the power supply from the circuit comprising the load and the other electrode bodies 14a-14h during charging.

Similarly to the current isolator in FIG. 19, the current isolators 90 in FIG. 20 prevent current from flowing directly between the other electrode bodies 14b-14h and the power supply via the circuit during charging, and also among the electrode bodies, except as enabled by the progressive growth of the fuel. Stated differently, the isolators 90 prevent the potential of the power supply from being applied directly to those electrode bodies 14b-14h via the circuit during charging. Thus, the electrical current/potential is only applied to electrode bodes 14b-14h via the electrodeposition growth within the stack as described above. Preferably, the current isolator 90 in FIG. 20 is a switch that moves between open and closed positions, as a diode would not provide an isolation function in the illustrated design. Likewise, the second current isolators 92 prevents current from flowing between the electrodes and the power supply during power generation, but allows current to flow from the power supply during charging; and the third current isolator 94 prevents current from flowing between the second electrode and the circuit portion comprising the load and the other electrode bodies 14a-14h during charging, but allows current to flow from the load to the second electrode 12 during power generation. These second and third current isolators may be omitted in some systems. As such, the only way for the electrical current/potential to be applied to those electrode bodies 14b-14h is via the electrodeposited growth within the stack as described above. The current isolators may take any form, including those mentioned above, and no particular isolator should be regarded as limiting.

It is also possible in any of the embodiments of the invention to apply the cathodic potential simultaneously to all the electrode bodies of the anode, rather than to just one to produce body-by-body progressive growth. Progressive growth emanating from one terminal is advantageous because it provides more density. Specifically, the growth in the previously connected electrode bodies continues as each subsequent body is connected by the progressing growth. However, progressive growth takes more time than applying the cathodic potential to multiple electrode bodies simultaneously. With all the electrode bodies subject to the same potential, the growth will only occur until a short occurs between the charging electrode 12/15 and the electrode body proximate to it. Thus, it is possible to have a faster, but less dense, growth in this manner, which may be amenable to certain re-charging needs.

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. Thus, the present invention is intended to encompass all modifications, substitutions, alterations, and equivalents within the spirit and scope of the following appended claims.

What is claimed is:
1. An electrochemical cell comprising:
 a first electrode comprising a series of permeable electrode bodies arranged in a spaced apart relation for holding an electrodeposited fuel;
 a second electrode spaced apart from the first electrode;
 a charging electrode;

an ionically conductive medium communicating the electrodes, the ionically conductive medium comprising reducible fuel ions of the electrodeposited fuel;

wherein the ionically conductive medium flows through the permeable electrode bodies; and wherein the spaced apart relation of said permeable electrode bodies of the first electrode enables an electrical current to be applied between the charging electrode and at least one of the permeable anode bodies during charging with the charging electrode functioning as an anode and the at least one permeable electrode body functioning as a cathode, such that the reducible fuel ions are reduced and electrodeposited as the fuel in oxidizable form on the at least one permeable electrode body, wherein the electrodeposition causes growth of the fuel among the permeable electrode bodies and within the spacing therebetween such that the electrodeposited fuel establishes an electrical connection between the permeable electrode bodies.

2. The electrochemical cell of claim 1, further comprising a first terminal connected to at least one of the permeable electrode bodies.

3. The electrochemical cell of claim 2, wherein the permeable electrode bodies of the first electrode are connected in parallel to the first terminal.

4. An electrochemical cell comprising:
a first electrode comprising a series of permeable electrode bodies arranged in spaced apart relation for holding an electrodeposited fuel;
a second electrode spaced apart from the first electrode;
a charging electrode;
an ionically conductive medium communicating the electrodes, the ionically conductive medium for comprising reducible fuel ions of the electrodeposited fuel; and
a first terminal connected to at least one of the permeable electrode bodies;
wherein the spaced apart relation of said permeable electrode bodies of the first electrode enables an electrical current to be applied between the charging electrode and at least one of the permeable anode bodies during charging with the charging electrode functioning as an anode and the at least one permeable electrode body functioning as a cathode, such that the reducible fuel ions are reduced and electrodeposited as the fuel in oxidizable form on the at least one permeable electrode body wherein the electrodeposition causes growth of the fuel among the permeable electrode bodies and within the spacing therebetween such that the electrodeposited fuel establishes an electrical connection between the permeable electrode bodies; and
wherein the at least one permeable electrode body to which the electrical current is applied and functioning as a cathode during charging is a single terminal electrode body connected to the first terminal, and wherein each other permeable electrode body is electrically isolated from the first terminal except by electrical connection of the electrodeposited fuel and the ionically conductive medium.

5. An electrochemical cell comprising:
a first electrode comprising a series of permeable electrode bodies arranged in spaced apart relation for holding an electrodeposited fuel;
a second electrode spaced apart from the first electrode;
a charging electrode;
an ionically conductive medium communicating the electrodes, the ionically conductive medium for comprising reducible fuel ions of the electrodeposited fuel; and a first terminal connected to at least one of the permeable electrode bodies;
wherein the permeable electrode bodies of the first electrode are connected in parallel to the first terminal;
wherein the spaced apart relation of said permeable electrode bodies of the first electrode enables an electrical current to be applied between the charging electrode and at least one of the permeable anode bodies during charging with the charging electrode functioning as an anode and the at least one permeable electrode body functioning as a cathode, such that the reducible fuel ions are reduced and electrodeposited as the fuel in oxidizable form on the at least one permeable electrode body, wherein the electrodeposition causes growth of the fuel among the permeable electrode bodies and within the spacing therebetween such that the electrodeposited fuel establishes an electrical connection between the permeable electrode bodies;
wherein the at least one permeable electrode body to which the electrical current is applied and functioning as a cathode during charging is a single terminal electrode body connected to the first terminal, and
wherein the cell further comprises a current isolator between each other permeable electrode body and the first terminal, the each current isolator being configured to electrically isolate each other permeable electrode body from the first terminal except by electrical connection of the electrodeposited fuel at least during charging.

6. The electrochemical cell of claim 5, wherein each current isolator is a switch moveable between open and closed positions.

7. The electrochemical cell of claim 5, wherein each current isolator is a one-way diode.

8. The electrochemical cell of claim 5, wherein each current isolator is also configured to permit current to flow from each other electrode body to a load during discharge when the first electrode is functioning as an anode.

9. The electrochemical cell of claim 8, wherein each current isolator is a switch moveable between open and closed positions.

10. The electrochemical cell of claim 8, wherein each current isolator is a one-way diode.

11. The electrochemical cell of claim 1, wherein the permeable electrode bodies of the first electrode are selectively connected in parallel for selective connection of each to a load during discharging and a power supply during charging.

12. An electrochemical cell comprising:
a first electrode comprising a series of permeable electrode bodies arranged in spaced apart relation for holding an electrodeposited fuel;
a second electrode spaced apart from the first electrode;
a charging electrode;
an ionically conductive medium communicating the electrodes, the ionically conductive medium for comprising reducible fuel ions of the electrodeposited fuel;
wherein the spaced apart relation of said permeable electrode bodies of the first electrode enables an electrical current to be applied between the charging electrode and at least one of the permeable anode bodies during charging with the charging electrode functioning as an anode and the at least one permeable electrode body functioning as a cathode, such that the reducible fuel ions are reduced and electrodeposited as the fuel in oxidizable form on the at least one permeable electrode body, wherein the electrodeposition causes growth of the fuel among the permeable electrode bodies and within the spacing therebetween such that the electrodeposited fuel establishes an electrical connection between the permeable electrode bodies;

wherein the permeable electrode bodies of the first electrode are connected in parallel for selective connection to a load during discharging and a power supply during charging wherein the permeable electrode bodies includes a terminal electrode body and one or more other electrode bodies, wherein the cell further comprises a current isolator between each other permeable electrode body for electrically isolating each other permeable electrode body except by communication of ions through the ionically conductive medium and by electrical connection of the electrodeposited fuel from the power supply during charging, and permitting current to flow from each other electrode body to the load during discharging when the first electrode is functioning as an anode.

13. The electrochemical cell of claim 1, wherein the charging electrode is spaced apart from the first electrode, the charging electrode being selected from the group consisting of (a) the second electrode, and (b) a third electrode.

14. The electrochemical cell of claim 3, wherein the charging electrode is spaced apart from the first electrode, the charging electrode being selected from the group consisting of (a) the second electrode, and (b) a third electrode.

15. The electrochemical cell of claim 4, wherein the charging electrode is spaced apart from the first electrode, the charging electrode being selected from the group consisting of (a) the second electrode, and (b) a third electrode.

16. The electrochemical cell of claim 5, wherein the charging electrode is spaced apart from the first electrode, the charging electrode being selected from the group consisting of (a) the second electrode, and (b) a third electrode.

17. The electrochemical cell of claim 8, wherein the charging electrode is spaced apart from the first electrode, the charging electrode being selected from the group consisting of (a) the second electrode, and (b) a third electrode.

18. The electrochemical cell of claim 11, wherein the charging electrode is spaced apart from the first electrode, the charging electrode being selected from the group consisting of (a) the second electrode, and (b) a third electrode.

19. The electrochemical cell of claim 12, wherein the charging electrode is spaced apart from the first electrode, the charging electrode being selected from the group consisting of (a) the second electrode, and (b) a third electrode.

20. The electrochemical cell of claim 13, wherein the charging electrode is spaced apart from the first electrode, the charging electrode being selected from the group consisting of (a) the second electrode, and (b) a third electrode.

21. The electrochemical cell according to claim 1, wherein the second electrode is an air electrode for reducing oxygen during discharge.

22. The electrochemical cell according to claim 1, wherein the first electrode has the electrodeposited fuel thereon and the fuel is a metal for oxidation during discharge.

23. The electrochemical cell according to claim 22, wherein the metal is selected from the group consisting of zinc, iron, aluminum and magnesium.

24. The electrochemical cell according to claim 1, wherein the ionically conductive medium is an aqueous solution.

25. The electrochemical cell according to claim 24, wherein the aqueous solution is alkaline.

26. The electrochemical cell according to claim 1, further comprising inert, non-conductive separators to maintain separation and electrical isolation between the permeable electrode bodies.

27. The electrochemical cell according to claim 3, wherein the second electrode is an air electrode for reducing oxygen during discharge.

28. The electrochemical cell according to claim 3, wherein the first electrode has the electrodeposited fuel thereon and the fuel is a metal for oxidation during discharge.

29. The electrochemical cell according to claim 28, wherein the metal is selected from the group consisting of zinc, iron, aluminum and magnesium.

30. The electrochemical cell according to claim 3, wherein the ionically conductive medium is an aqueous solution.

31. The electrochemical cell according to claim 30, wherein the aqueous solution is alkaline.

32. The electrochemical cell according to claim 3, further comprising inert, non-conductive separators to maintain separation and electrical isolation between the permeable electrode bodies.

33. The electrochemical cell according to claim 12, wherein the second electrode is an air electrode for reducing oxygen during discharge.

34. The electrochemical cell according to claim 12, wherein the first electrode has the electrodeposited fuel thereon and the fuel is a metal for oxidation during discharge.

35. The electrochemical cell according to claim 34, wherein the metal is selected from the group consisting of zinc, iron, aluminum and magnesium.

36. The electrochemical cell according to claim 12, wherein the ionically conductive medium is an aqueous solution.

37. The electrochemical cell according to claim 36, wherein the aqueous solution is alkaline.

38. The electrochemical cell according to claim 12, further comprising inert, non-conductive separators to maintain separation and electrical isolation between the permeable electrode bodies.

* * * * *